(12) United States Patent
Kajiyama

(10) Patent No.: US 6,841,741 B2
(45) Date of Patent: Jan. 11, 2005

(54) SEAT WEIGHT MEASURING APPARATUS

(75) Inventor: Hiroshi Kajiyama, Shiga (JP)

(73) Assignee: Takata Corporation, Tokyo (JP)

( * ) Notice: Subject to any disclaimer, the term of this patent is extended or adjusted under 35 U.S.C. 154(b) by 97 days.

(21) Appl. No.: 10/248,021

(22) Filed: Dec. 11, 2002

(65) Prior Publication Data

US 2003/0111276 A1 Jun. 19, 2003

(30) Foreign Application Priority Data

Dec. 13, 2001 (JP) .................................... 2001-379906

(51) Int. Cl.$^7$ ............................................. B60R 21/32
(52) U.S. Cl. ..................... 177/144; 180/273; 280/735
(58) Field of Search ............................... 177/136, 144, 177/210 R; 180/273; 280/735; 701/45; 340/665, 666

(56) References Cited

U.S. PATENT DOCUMENTS

| | | | |
|---|---|---|---|
| 6,069,325 A | 5/2000 | Aoki | 177/144 |
| 6,161,891 A * | 12/2000 | Blakesley | 296/65.01 |
| 6,323,443 B1 | 11/2001 | Aoki et al. | 177/144 |
| 6,323,444 B1 | 11/2001 | Aoki | 177/144 |
| 6,385,823 B1 | 5/2002 | Yamaguchi et al. | 24/641 |
| 6,407,347 B1 * | 6/2002 | Blakesley | 177/144 |
| 6,448,512 B1 * | 9/2002 | Cooper | 177/144 |
| 6,695,379 B1 * | 2/2004 | Ishida | 296/65.14 |
| 2002/0062998 A1 * | 5/2002 | Curtis et al. | |
| 2003/0106723 A1 * | 6/2003 | Thakur et al. | |
| 2004/0035613 A1 * | 2/2004 | Wolfe et al. | |

FOREIGN PATENT DOCUMENTS

| | | |
|---|---|---|
| DE | 19852541 C1 | 3/2000 |
| DE | 10041773 A1 | 3/2001 |
| JP | 10-297334 A | 11/1998 |
| JP | 2000-258233 A | 9/2000 |
| JP | 2001-012998 A | 1/2001 |
| JP | 2001-304949 A | 10/2001 |

* cited by examiner

*Primary Examiner*—Randy W. Gibson
(74) *Attorney, Agent, or Firm*—Foley & Lardner LLP

(57) ABSTRACT

A seat weight measuring apparatus having enough strength against load in a direction in which a rear side of the vehicle seat is lifted. The seat weight measuring apparatus includes a base frame with a mounting portion at the rear end side of the base frame. The mounting portion includes two stopper bolts as protective mechanisms for transmitting excessive load from a rear rail bracket to the base frame. One stopper bolt is a front (first) stopper bolt, and the other is a rear (second) stopper bolt. Therefore, the mounting portion has higher capability to withstand load than a mounting portion at the front end side of the base frame.

12 Claims, 15 Drawing Sheets

FIGURE 5
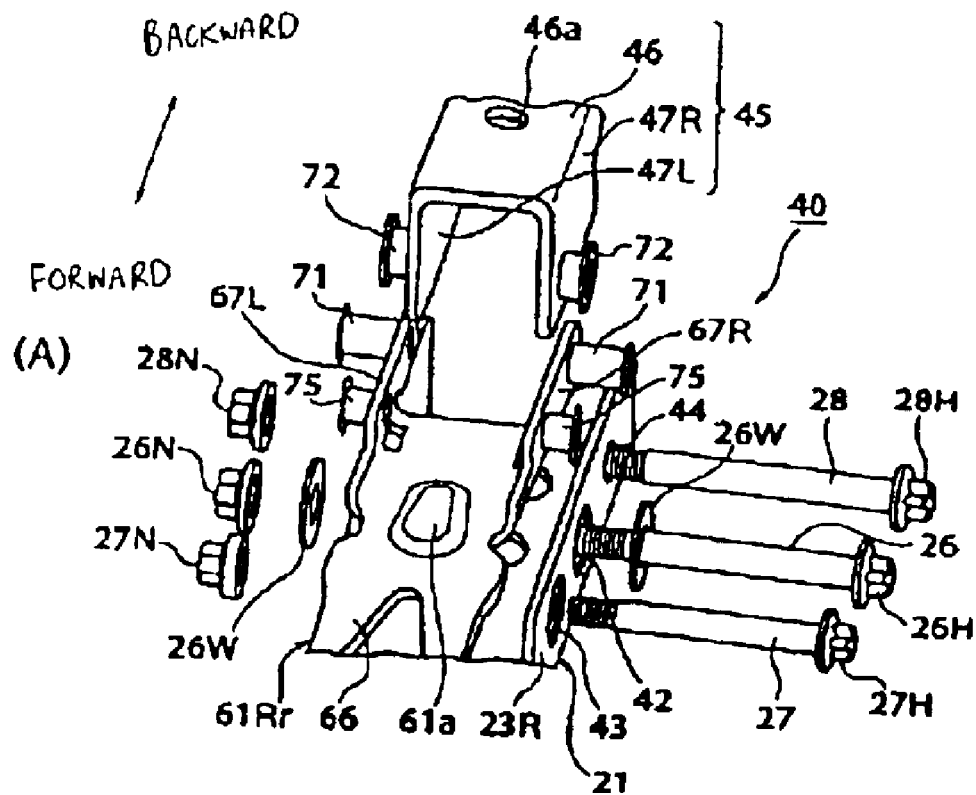
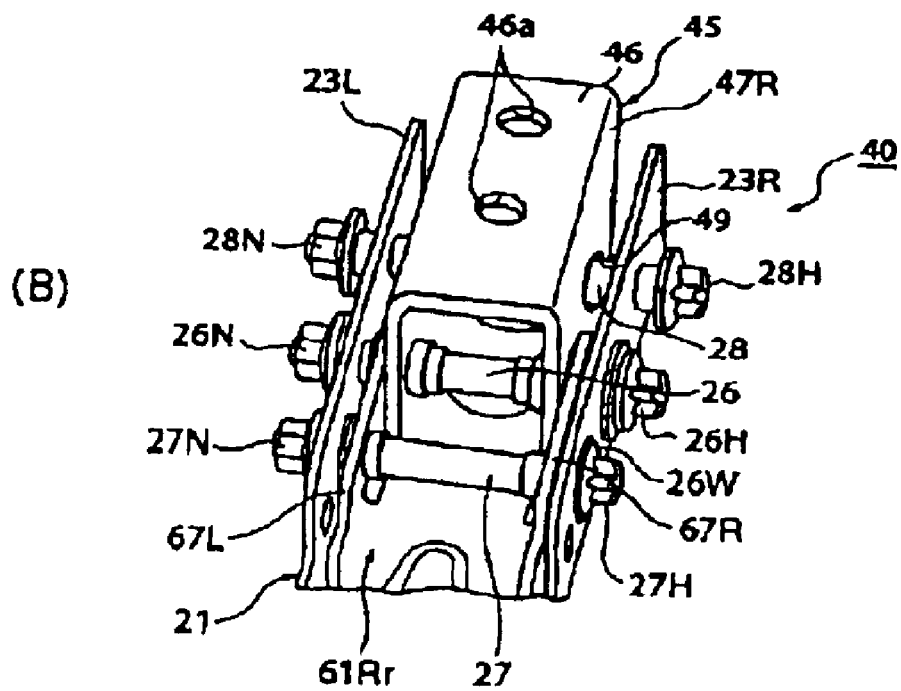

FIGURE 6
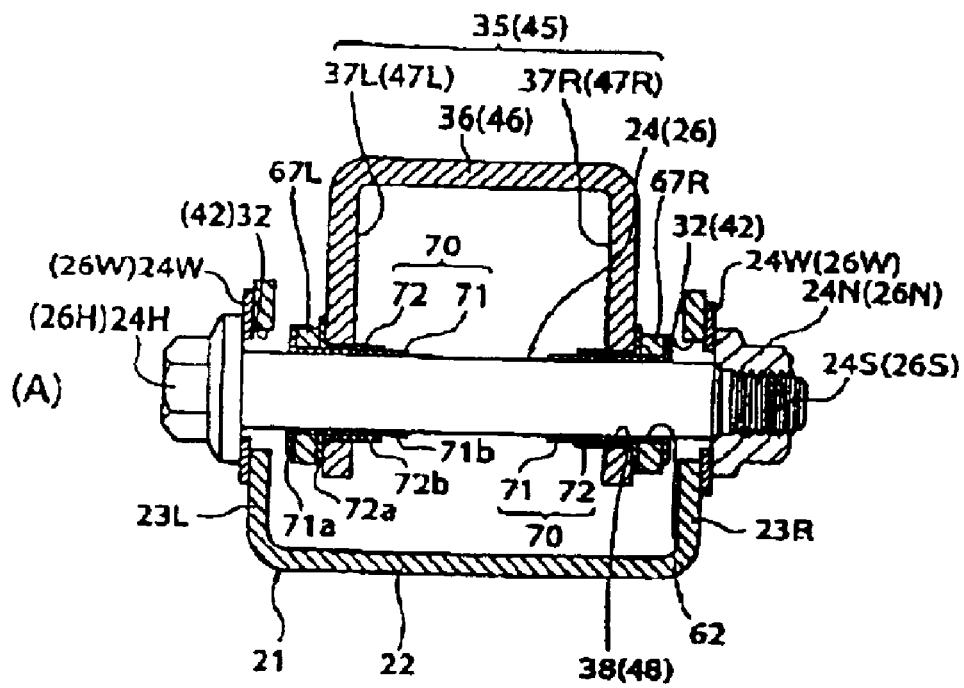
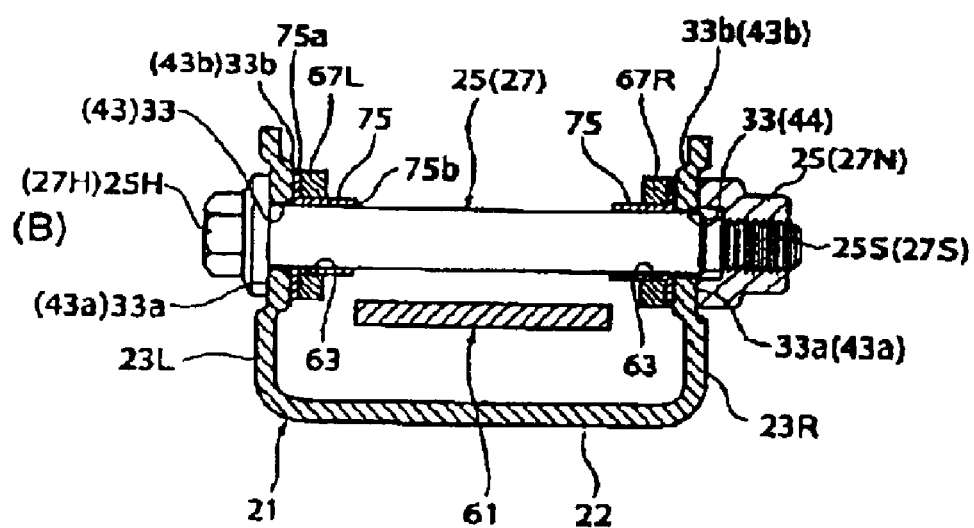

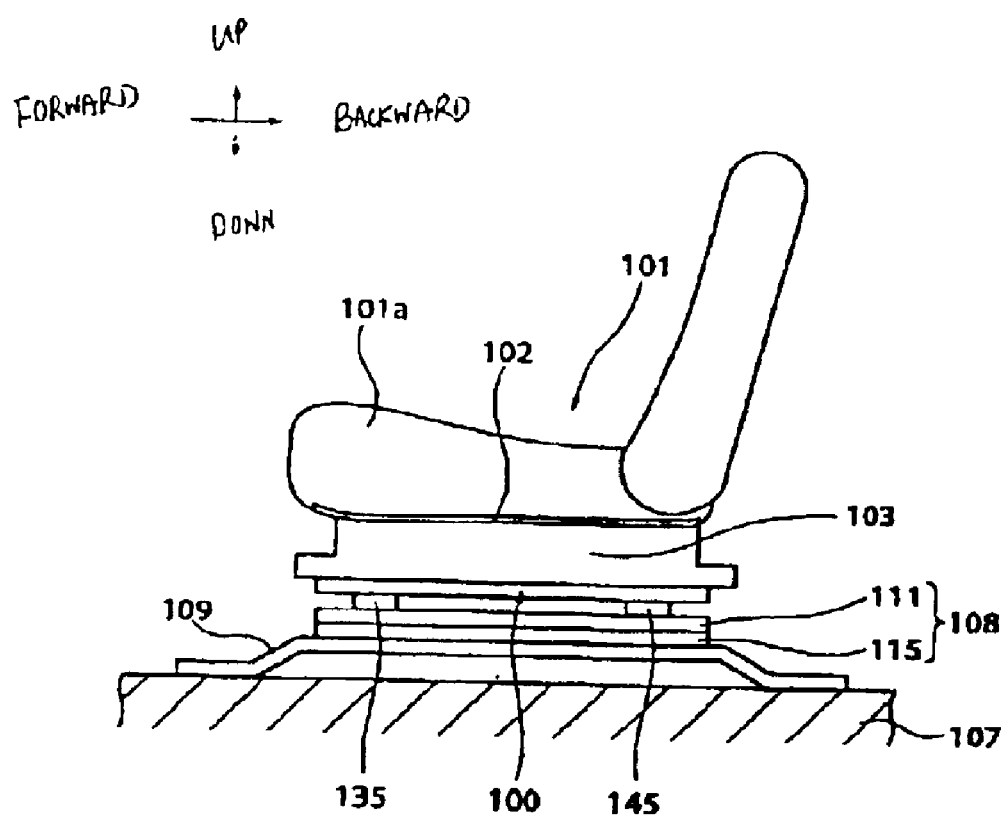

SEAT WEIGHT MEASURING APPARATUS

BACKGROUND

The present invention relates to an apparatus for measuring a seat weight, including the weight of a passenger sitting on a vehicle seat. Particularly, the present invention relates to a seat weight measuring apparatus which has enough strength against load in a direction in which a rear side of the vehicle seat is lifted.

Automobiles are equipped with seat belt devices and airbag devices to secure safety for passengers in the automobiles. In recent years, there is a trend for controlling the actions of these safety devices depending on the weight (body weight) of a passenger in order to improve the performance of seat belt devices and/or airbag devices. For example, the amount of gas for deploying the airbag, the airbag inflating speed, or the pretension load of the seat belt may be adjusted depending on the weight of the passenger. For that purpose, it is necessary to somehow measure the weight of the passenger sitting on the seat.

One example for achieving this objective is a seat weight measuring apparatus employing strain gauges as load sensors. Load sensors to be used for this purpose are required to have both sufficiently high accuracy of detection and sufficient fracture strength. The accuracy of detection required for the load sensor for a load in the gravitational direction is a level enabling a load variation of about 100 g to be detected. It is required that the accuracy is not affected when a load of 100 kg is applied in any direction other than the gravitational direction. On the other hand, as for the strength of the load sensor, it is required that the sensor is not broken even when it is subjected to a large load in the event of a vehicle collision. Examples of load sensors satisfying the above mentioned conditions are disclosed in Japanese Patent Unexamined Publication No. H11-304579, Japanese Patent Unexamined Publication No. H11-351952, Japanese Patent Unexamined Publication No. 2000-258233, Japanese Patent Unexamined Publication No. 2000-122068, and Patent Unexamined Publication No. 2001-12998, each of which is hereby incorporated by reference herein.

Further, large negative G may be applied to a vehicle body so as to create a moment lifting up the rear side of a vehicle seat in the event of a vehicle collision. Accordingly, one object of the present invention is to provide a seat weight measuring apparatus having enough strength against load in a direction in which the rear side of the vehicle seat is lifted.

Another object of the present invention is to provide a seat weight measuring apparatus that does not generate noise that hurts passengers' ears.

SUMMARY OF THE INVENTION

According to an embodiment of the present invention, a seat weight measuring apparatus for measuring a seat weight, including the weight of a passenger sitting on a vehicle seat, includes a base frame, front and rear rail brackets, a sensor portion for detecting the load applied from the rail brackets to the base frame, and protective mechanisms. The base frame is fixed to a vehicle floor, and the front and rear rail brackets are located near front and rear ends of the base frame, respectively. The front and rear rail brackets are connected to a seat rail that is slidable in the frontward and rearward directions of a vehicle. The sensor portion is mounted on the base frame and includes a distortion sensor fixed at the middle in the longitudinal direction of the base frame. The sensor portion further includes arms that are disposed at a front portion and a rear portion of the base frame, respectively, to extend in the longitudinal direction, and each arm is provided at its one end (the center-side end) with a press portion for transmitting force to the distortion sensor and at its other end (its front or rear end) with a connecting portion relative to each rail bracket. Protective mechanisms are disposed around the front and rear rail brackets. When the load applied to the rail brackets and the base frame exceeds a predetermined value, the protective mechanisms transmit the excessive load between the rail brackets and the base frame or vehicle floor directly and not through the arms. The protective mechanism at the rear side is provided with a reinforcing member for providing reinforcement against the load in a direction in which the rail brackets are lifted upward.

According to another embodiment of the present invention, a seat weight measuring apparatus for measuring a seat weight, including the weight of a passenger sitting on a vehicle seat, includes a base frame, front and rear rail brackets, a sensor portion, and protective mechanisms. The base frame is fixed to a lower side of a seat frame below a vehicle seat. The front and rear rail brackets are located near front and rear ends of the base frame, respectively, and are connected to a seat rail which is slidable in the frontward and rearward directions of the vehicle. The sensor portion is mounted to the base frame and includes a distortion sensor fixed at the middle in the longitudinal direction of the base frame. The sensor portion further includes arms that are disposed at a front portion and a rear portion of the base frame, respectively, to extend in the longitudinal direction, and each arm is provided at its one end (the center-side end) with a press portion for transmitting force to the distortion sensor and at its other end (its front or rear end) with a connecting portion relative to each rail bracket. Protective mechanisms are disposed around the front and rear rail brackets. When the load applied on the base frame and the rail brackets exceeds a predetermined value, the protective mechanisms transmit the excessive load from the base frame to the rail brackets directly and not through the arms. The protective mechanism at the rear side is provided with a reinforcing member for providing reinforcement against the load in a direction in which the base frame is lifted upward.

When large negative G is applied to a vehicle body, for example, in the event of a vehicle collision, a moment is created to incline a vehicle seat toward the front so that the rear side of the vehicle seat is lifted. According to the present invention, since the reinforcing member for providing reinforcement against the load of lifting the rail brackets or the base frame upward is provided, the apparatus has higher capability to withstand load in a direction of lifting up the rear side of the vehicle seat.

In the first mentioned embodiment of the present invention, the seat weight measuring apparatus is mounted between the seat rail and the vehicle floor. In the second mentioned embodiment of the present invention, the seat weight measuring apparatus is mounted between the seat rail and the vehicle seat.

One purpose of the present invention is to measure the weight of a passenger on the vehicle seat. Therefore, an apparatus which measures the weight of a passenger, while eliminating the weight of the vehicle seat itself, is included in the seat weight measuring apparatus.

In the seat weight measuring apparatus of the present invention, the protective mechanism at the rear side may include first and second stopper bolts. The first stopper bolt connects the rail bracket and arm in such a manner as to allow the pivotal movement of them and is stopped by the base frame in the event of excessive load. The second stopper bolt acts as a reinforcing member which transmits the excessive load between the rail bracket and base frame or vehicle floor to prevent the deformation of the apparatus due to the excessive load. That is, the first stopper bolt takes a task of transmitting load from the rail bracket to the arm and also of bearing the excessive load, while the second stopper bolt is a member used exclusively for reinforcing the protective mechanism.

In this case, the second stopper bolt bears the most of the excessive load exerted on the rail bracket and the base frame. Therefore, although simple in structure, the reinforcement of the mounting structure of the seat weight measuring apparatus can be realized just by using the stopper bolts. By employing nuts for fastening the stopper bolts, the mounting operation can be securely facilitated.

Further, the second stopper bolt may be fixed to the base frame or vehicle floor and may be loosely fitted to the rail bracket, and the first stopper bolt may be loosely fitted to the base frame. In this case, the second stopper bolt does not move relative to the base frame and vehicle floor, thereby facilitating the structure.

In the seat weight measuring apparatus of the present invention, the second stopper bolt may be positioned right above or right below the connecting portion of the seat rail and the seat bracket.

According to this structure, little moment of bending the rail bracket and little moment of breaking the connecting portion are created. The stress level to the rail bracket and the connecting portion and deformation thereof can be reduced.

In the seat weight measuring apparatus of the present invention, the reinforcing member may be fixed directly to the seat bracket on the vehicle floor, and the excessive load can be transmitted from the rail bracket to the seat bracket through the reinforcing member.

In this case, the excessive load is transmitted directly to a member (for example, the seat bracket) of the vehicle floor via the second stopper bolt, thereby further providing advantages for the strength In the seat weight measuring apparatus of the present invention, the seat rail and the rail bracket may be connected to each other by rivet(s), the vertical center line of the rivet(s) may be shifted from the vertical center line of the first stopper bolt, and the vertical center line of the rivet(s) may substantially coincide with the vertical center line of the second stopper bolt.

After assembling the arm and the first stopper bolt in the base frame, the seat weight measuring apparatus and the seat rail (or the seat bracket) are riveted together. The first stopper bolt and the arm do not interfere with the riveting work because the positions of the rivets are shifted from the positions of the first stopper bolt and the rear ends of the arm. In addition, since the vertical center lines of the rivets and the second stopper bolt substantially coincide with each other, little force of breaking the rivets and little moment of bending the rail bracket are created. That is, the apparatus has a structure which is uniform in strength.

In another embodiment of the present invention, the seat weight measuring apparatus for measuring a seat weight, including the weight of a passenger sitting on a vehicle seat, includes a base frame, rail brackets, and a sensor portion. The base frame extends in the frontward and rearward directions of the vehicle. The rail brackets are located near front and rear ends of the base frame, respectively, to interpose between the base frame and a seat rail which is slidable in the frontward and rearward directions of the vehicle. The sensor portion is mounted on the base frame and includes a distortion sensor fixed at the middle in the longitudinal direction of the base frame. The sensor portion further includes arms that are disposed at a front portion and a rear portion of the base frame, respectively, to extend in the longitudinal direction, and each arm is provided at its one end (the center-side end) with a press portion for transmitting force to the distortion sensor and at its other end (its front or rear end) with a connecting portion relative to the each rail bracket. Additionally, tip ends of the press portions of the arms are covered with resin caps.

According to this structure, noises (contact noise between metals) generated when the press portions of the arms collide with the distortion sensor can be nearly completely absorbed, thereby preventing the passenger sitting on the seat from hearing jarring sounds.

It is understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

FIG. 5(A) is an enlarged perspective view of a rear end portion of the seat weight measuring apparatus in the exploded state.

FIG. 5(B) is an enlarged perspective view of a rear end portion of the seat weight measuring apparatus in the assembled state.

FIG. 6(A) is an enlarged front sectional view of a bolt-mounting portion of the seat weight measuring apparatus taken along the axis of a front stopper bolt.

FIG. 6(B) is an enlarged front sectional view of a bolt-mounting portion of the seat weight measuring apparatus taken along the axis of a pivot bolt.

FIG. 15 is a side view schematically showing a whole vehicle seat provided with the seat weight measuring apparatus according to the second embodiment of the present invention.

DETAILED DESCRIPTION

Embodiments of the present invention will be described below with reference to the accompanying drawings.

In the following explanation, except in special cases, the upward and downward directions mean the gravitational directions, the forward and backward directions mean the forward and backward directions of a vehicle, and the leftward and rightward directions mean the leftward and rightward directions for a driver in the vehicle. These directions are indicated by arrows in the respective drawings.

First, the structure about a vehicle seat according to an embodiment of the present invention will be described with reference to FIG. 8.

Figure 8:
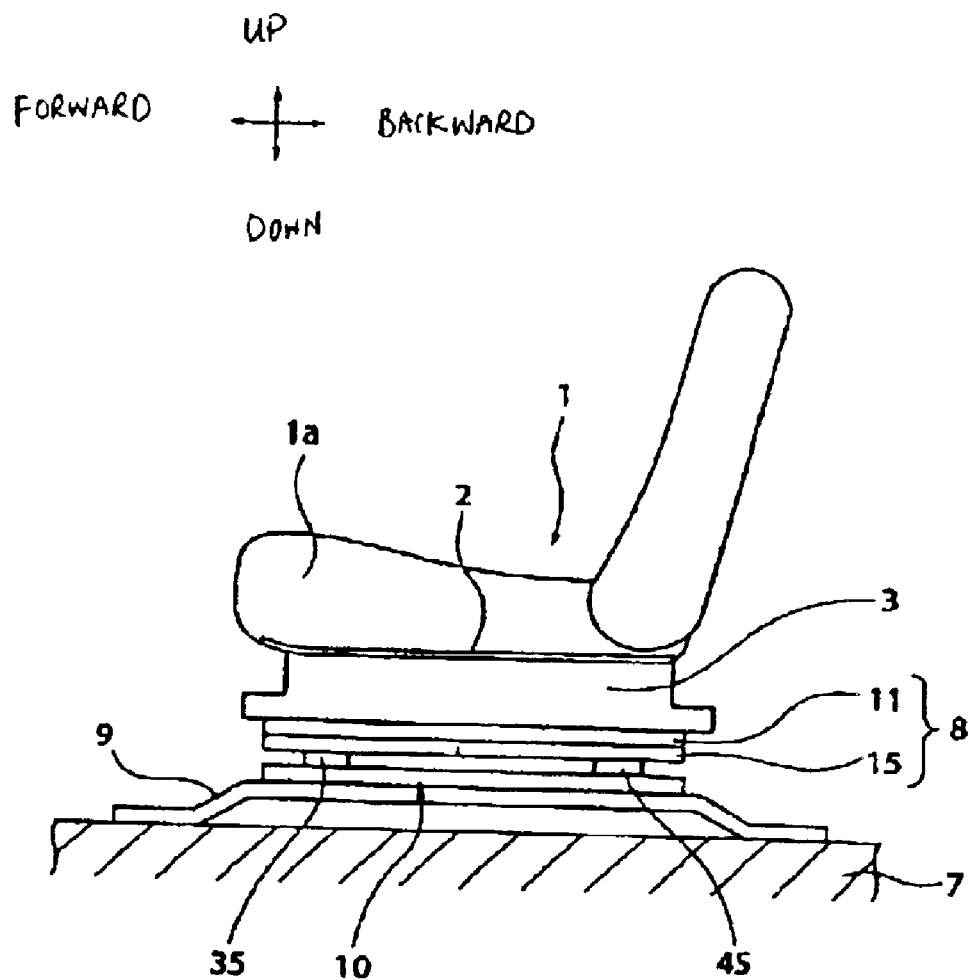
FIG. 8 is a side view schematically showing a whole vehicle seat provided with the seat weight measuring apparatus according to the first embodiment of the present invention.

FIG. 8 shows a vehicle seat 1. The vehicle seat 1 has a seat cushion 1a on which a person can sit. A seat pan 2 made of a steel plate is disposed beneath the seat cushion 1a. The seat pan 2 extends to cover the lower surface of the seat cushion 1a. Under the seat pan 2, side frames 3 made of steel plates extend downwardly from the seat pan 2. Each of the side frames 3 is connected at its lower side to a seat rail 8. The seat rail 8 is a combination of an upper rail 11 and a lower rail 15 which are arranged to slide each other in the forward and backward directions.

The lower rail 15 is connected at its lower side to a seat weight measuring apparatus 10 via front and rear rail brackets 35, 45. The seat weight measuring apparatus 10 is fixed to a seat bracket 9 secured to a vehicle floor 7. The same constructions each composed of the side frame 3, the seat rail 8, the seat weight measuring apparatus 10, and the seat bracket 9 are disposed on the left and right sides of the seat 1, respectively. The seat rail 8 (the upper rail 11 and the lower rail 15) extends in the forward and backward direction. As the seat rail 8, a conventional seat rail such as of T-shaped type and Y-shaped type may be employed.

Hereinafter, the details of the seat weight measuring apparatus 10 of the first embodiment will be described.

Figure 1:
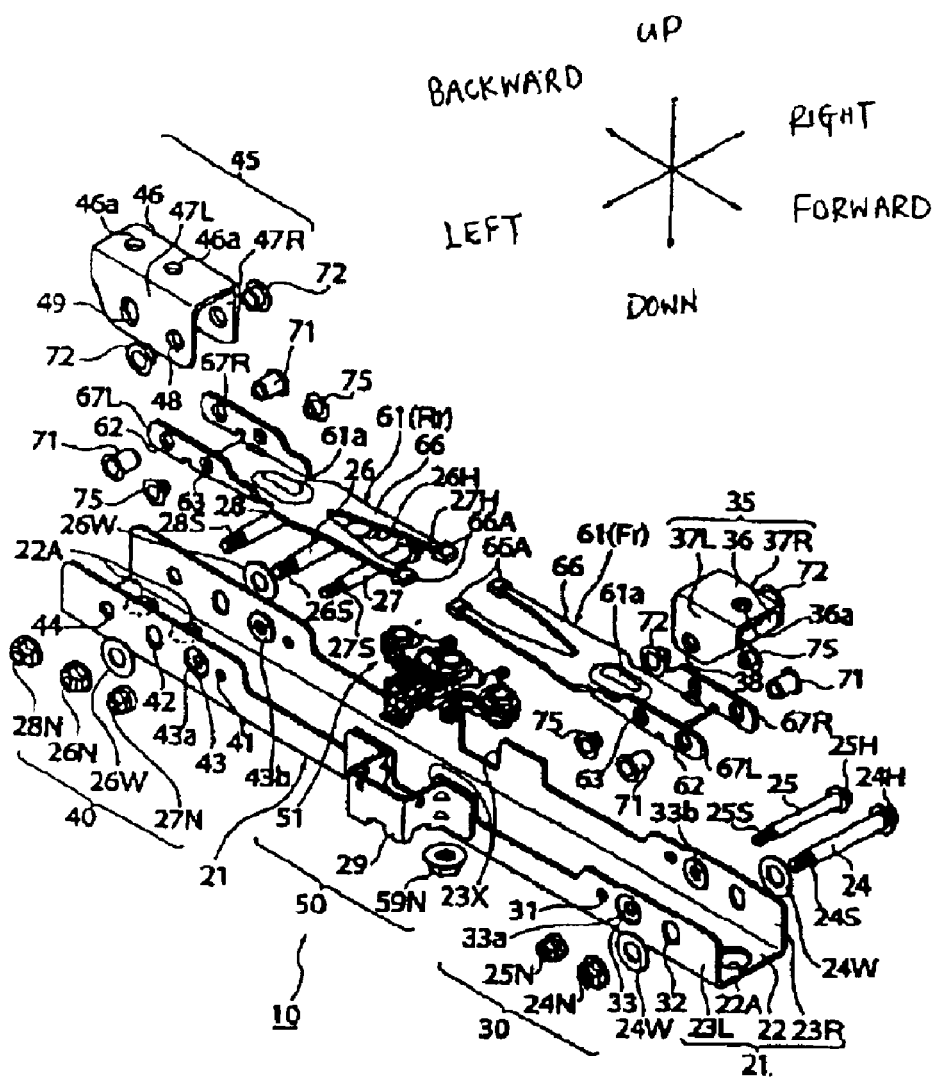
FIG. 1 is an exploded perspective view showing the general structure of a seat weight measuring apparatus according to the first embodiment of the present invention.
Figure 3:
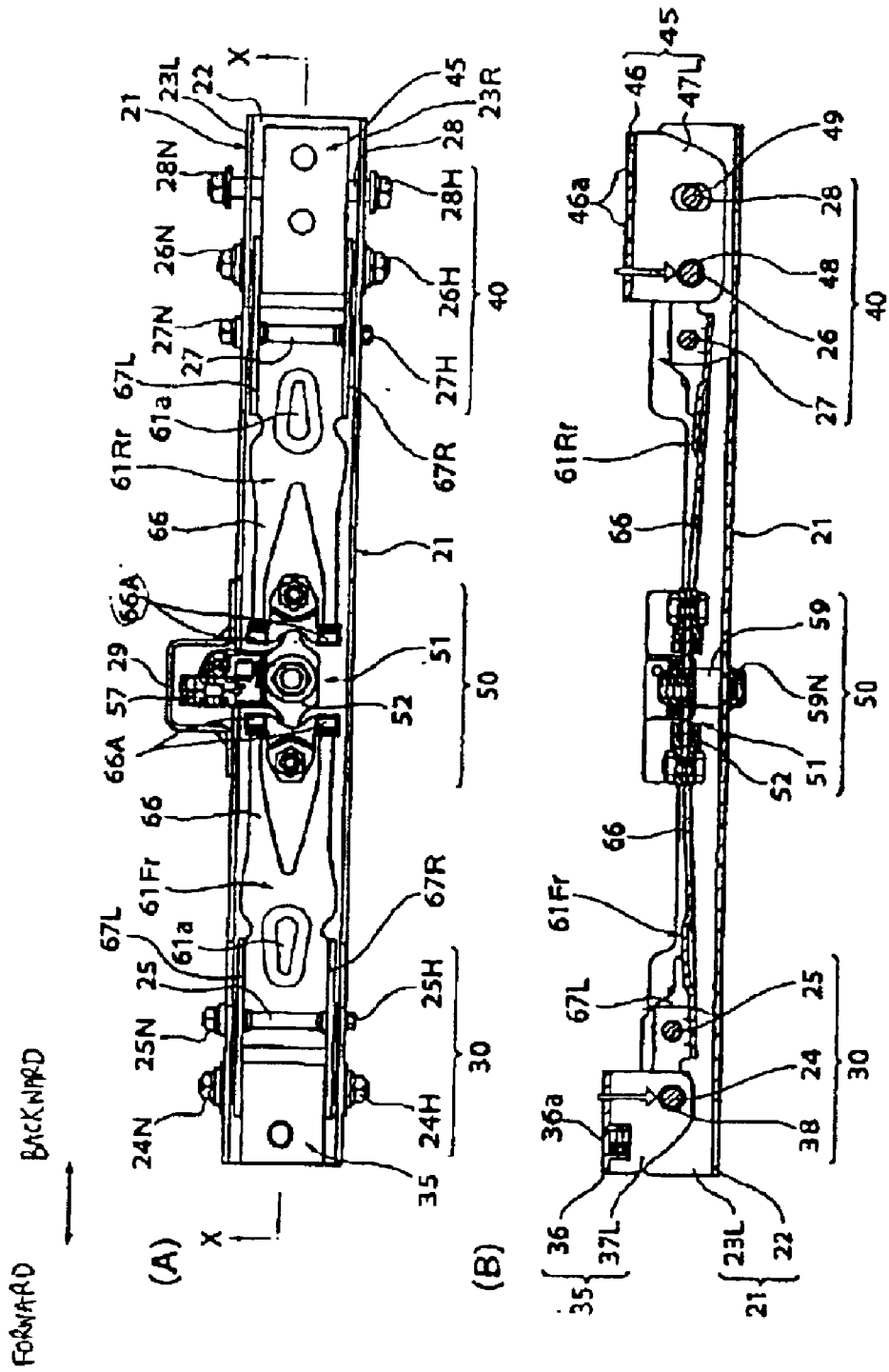
FIG. 3(A) is a plan view showing the general structure (in the assembled state) of the seat weight measuring apparatus.
FIG. 3(B) is a sectional view taken along a line X—X of FIG. 3(A).

As shown in the drawings such as FIG. 1, FIG. 3, the seat weight measuring apparatus 10 comprises a base frame 21 which extends long in the forward and backward direction. The base frame 21 is a product made by press-working of a steel plate having a U-shaped cross section. The bottom of the base frame 21 will be called a base bottom plate 22 and portions which stand from the left and right edges of the base bottom plate 22 to form corners of 90° therebetween will be called base side plates 23 (23L, 23R). It should be noted that the base frame will be sometimes called just base.

The base frame 21 is provided near the front and rear ends thereof with mounting portions 30, 40, respectively, for attaching the base frame to a vehicle body or the seat rail and is provided at the center thereof with a sensor portion 50.

First, the mounting portion 30 at the front end side of the base frame 21 will be explained.

The base bottom plate 22 has holes 22A at predetermined locations (see FIG. 1). The holes 22A are holes for insertion of calking jigs (see mark J in FIG. 9(A)) as will be described later and holes for insertion of rivets (see mark 9R in FIGS. 9(A), 9(B), FIGS. 10(A), 10(B)) for fixing the base to the seat brackets 9 (see FIG. 8, FIGS. 10(A), 10(B)).

Each base side plate 23 has three holes (an elongate hole 32, a pivot hole 33, and a small hole 31) formed in a front end portion thereof. The holes 32, 33, and 31 of the base side plate 23L are formed to face those of the opposite base side plate 23R.

The elongate holes 32 formed near the front end of the base are long in the upward and downward direction. As shown in FIG. 1, FIG. 3, and FIG. 6(A), a stopper bolt (pivot pin) 24 is inserted through the elongated holes 32. The stopper bolt 24 is a pivot pin which supports a rail bracket 35 and an arm 61 together and transmits load to the arm 61 as shown in FIG. 3(B). The stopper bolt 24 is provided at one end with a hexagon head 24H, at the other end with a threaded portion 24S, and at the middle with a smooth cylindrical surface. The stopper bolt 24 is inserted through the elongated holes 32 and is then fixed by a stopper nut 24N via a stopper washer 24W.

As can be seen clearly in FIG. 6(A), there is a gap between the stopper bolt 24 and each elongate hole 32 in the assembled state so that the stopper bolt 24 is normally prevented from touching the inner peripheries of the elongated holes 32. However, when an excessive load is applied to the seat, the stopper bolt 24 is lowered to come in contact with the lower peripheries of the elongate holes 32 so that the excessive load is transmitted directly to the base side plates 23 of the base frame 21 from the rail bracket 35, whereby the excessive load is not transmitted to a load sensor (sensor plate 52, as described later). When the rail bracket 35 is lifted up because of some effect of forces applied to the seat, the stopper bolt 24 is lifted up to come in contact with the upper peripheries of the elongated holes 32 so as to exhibit the same works.

As shown in FIG. 1, the pivot holes 33 are formed in positions closer to the center than the positions of the elongated holes 32. Formed around the pivot holes 33 are counter bores 33a formed in outer surfaces of the base side plates 23 and convexities 33b formed in the inner surfaces of the base side plates 23. Inserted into the pivot holes 33 are a pivot bolt (pivot pin) 25 as shown in FIG. 1, FIG. 3 and FIG. 6(B). The pivot bolt 25 is a pivot pin for supporting the arm 61 pivotally relative to the base frame 21. When the seat weight is applied to the rail bracket 35 as shown in FIG. 3(B), the arm 61 pivots about the pivot bolt 25. The pivot bolt 25 is provided at one end with a hexagon head 25H, at the other end with a threaded portion 25S, and at the middle with a smooth cylindrical surface. The pivot bolt 25 is inserted through the pivot holes 33 and is then fixed by a pivot nut 25N.

Since the stopper bolt 24 and the pivot bolt 25 are of type to be fastened by the nuts 24N and 25N, these are easily and securely attached.

The small holes 31 formed adjacent to the pivot holes 33 are service holes for observation of the assembling state.

As shown in FIG. 1 and FIGS. 3(A), 3(B), the Z arm 61 (61Fr) is arranged inside the base frame 21 at the mounting portion 30 at the front end side of the base frame 21. The Z arm 61 has a center-side portion, when seen in plan view, which is forked into two branches (center-side branches 66) and has a rectangular portion near the front end. The Z arm 61 has arm side plates 67 (67L, 67R) near its ends. The arm side plates 67 (67L, 67R) are formed by upwardly folding left and right edge of the Z arm 61 at an angle of 90°. The center-side branches 66 are just flat plates. The arm side plates 67 extend along the inner surfaces of the base side plates 23 as shown in FIGS. 3(A), 3(B) and FIGS. 6(A), 6(B). There are gaps between the base side plates 23 and the arm side plates 67, respectively so that flanges of sleeves 70 (71, 72) and 75 are disposed between the base side plates 23 and the arm side plates 67, respectively.

As shown in FIG. 1, each of the side plates 67 of the Z arm 61 is provided with holes 62, 63 formed at locations corresponding to the elongate hole 32, the pivot hole 33 of the base side plate 23. As shown in FIG. 1, FIGS. 3(A), 3(B), FIGS. 6(A), 6(B), inserted into the holes 62 (corresponding to the elongate holes 32 of the base frame 21) formed near the end of the Z arm 61 is the stopper bolt 24. Inserted into the holes 63 (corresponding to the pivot holes 33 of the base frame 21) at the center side of the Z arm 61 is the pivot bolt 25.

In this arrangement of the first embodiment, the main task of the stopper bolt 24 is connecting the rail bracket 35 and the Z arm 61 in such a manner as to allow the pivotal movement of them and transmitting load to the Z arm 61 as can be seen clearly in FIG. 3(B). Since there are gaps between the stopper bolt 24 and the elongated holes 32, the base frame 21 and the stopper bolt 24 are normally prevented from interfering each other. The pivot bolt 25 is a pivot shaft which supports the Z arm 61 relative to the base frame 21 so that the Z arm 61 pivots about the pivot bolt 25 as shown in FIG. 3(B).

The center-side branches 66 of the Z arm 61 are separated from each other to the right and left and extend toward the center of the base 21. Each of the branches has a reduced width near the center. As shown in FIG. 1 and FIGS. 3(A), 3(B), a ridge portion 61a is formed in the central portion of the Z arm 61. The ridge portion 61a is formed by press-working to increase the strength of the Z arm 61. Action portions at the ends of the center-side branches 66 are covered by resin arm caps 66A, respectively. The resin arm caps 66A, i.e., the action end portions are sandwiched between wings 53a, 55a of upper and lower half arms 53, 55 (as will be detailed later) of the load sensor 51. Because of the arm caps 66A, noises (contact noise between metals) generated when the action end portions collide with the wings 53a, 55a of the half arms 53, 55 can be nearly completely absorbed, thereby preventing the passenger sitting on the seat from hearing jarring sounds. As a load is exerted on the rail bracket 35, the Z arm 61 slightly pivots, whereby the action end portions transmit the load to the sensor plate 52 through the half arms 53, 55.

At the mounting portion 30 at the front end side, the front rail bracket 35 is assembled inside the Z arm 61. As shown in FIG. 1, FIGS. 3(A), 3(B), and FIG. 6(A), the front rail bracket 35 made of steel member is formed to have an inverted U-shaped cross section as seen in front. The rear rail bracket 35 has a flat upper plate 36 and side plates 37 (37F, 37R) formed by downwardly folding left and right edge portions thereof at an angle of 90°. The lower rail 15 (see FIG. 8) of the seat rail 8 is mounted on the upper plate 36. The upper plate 36 has a hole 36a formed therein through which a rivet fastening the upper plate 36 to the seat rail is inserted. Each side plate 37 of the front rail bracket 35 is formed in a trapezoidal shape in its plan view. The left and right side plates 37 have holes 38, respectively, to confront each other. The holes 38 are formed at locations corresponding to the elongate holes 32 of the base side plates 23 and the holes 62 of the Z arm 61. In the assembled state, inserted into the holes 38 is the stopper bolt 24 as shown in FIGS. 3(A), 3(B), and FIG. 6(A).

Figure 7:
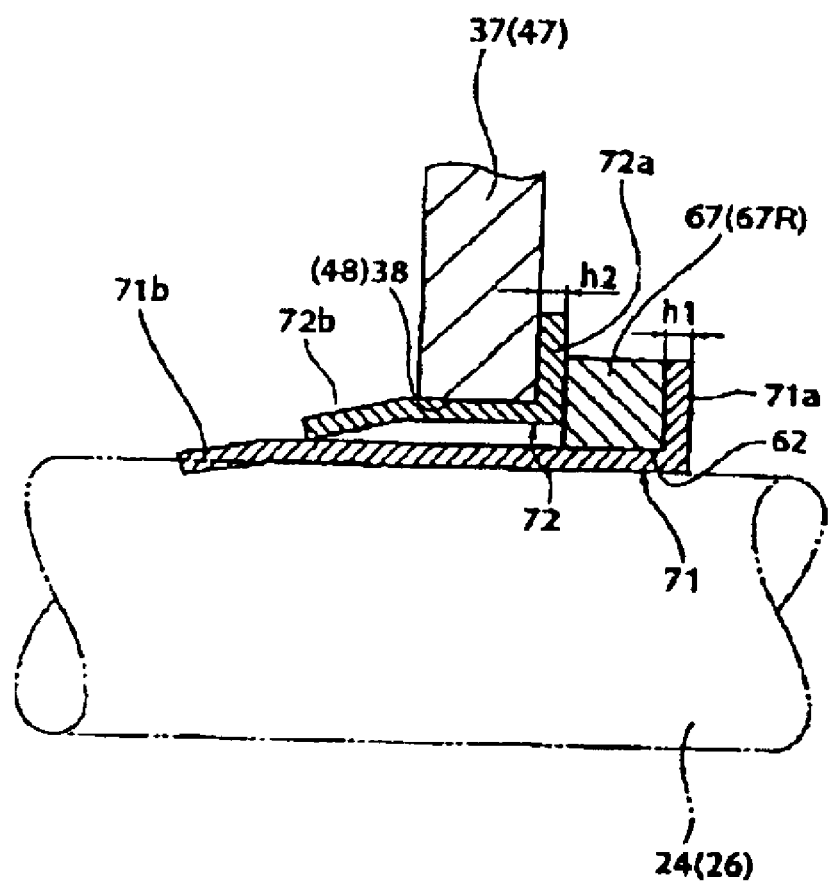
FIG. 7 is an enlarged sectional view schematically showing a portion about a double sleeve in an exaggerated way.

As can be seen clearly in FIG. 6(A) and FIG. 7, double sleeves 70 are fitted around the outer periphery of the cylindrical portion of the stopper bolt 24. The double sleeve 70 comprises an inner sleeve 71 which is long and an outer sleeve 72 which is short and fitted around the inner sleeve 71. The sleeves 71, 72 are products made by drawing steel sheets and have flanges 71a, 72a at one ends and tapered portions 71b, 72b (see FIG. 7) at the other ends. The inner surfaces of the sleeves 71, 72 and the end faces of the flanges 71a, 72a are coated with Teflon®.

FIG. 7 shows the inclinations of the tapered portions 71b, 72b in an exaggerated way.

The inner sleeve 71 of the double sleeve 70 is fitted into a space between the shaft portion of the stopper bolt 24 and the hole 62 of the arm side plate 67 and a space between the shaft portion of the stopper bolt 24 and the hole 38 of the front rail bracket 35. The outer sleeve 72 is press fitted between the outer periphery of the inner sleeve 71 and the hole 38 of the front rail bracket 35. The flange 72a of the outer sleeve 72 is disposed between the arm side plate 67 and the side plate 37 of the front rail bracket 35. The flange 71a of the inner sleeve 71 abuts on the outer surface of the arm side plate 67.

The relation between the double sleeve 70 and the peripheral components and the works of the double sleeve 70 will be explained with reference to FIG. 7.

Since the inner sleeve 71 is press fitted into the hole 62 of the arm side plate 67 in such a manner as to press the outer periphery of the sleeve 71 against the inner periphery of the hole 62, the inner sleeve 71 is prevented from rattling within the hole 62. Between the inner sleeve 71 and the stopper bolt 24 inserted through the inner bore of the inner sleeve 71, the tapered portion 71b of the inner sleeve 71 is elastically in contact with and supports the outer periphery of the stopper bolt 24. Therefore, while there is a clearance between a portion of the inner sleeve 71 other than the tapered portion 71b and the stopper bolt 24, the stopper bolt 24 is prevented from rattling within the inner bore of the inner sleeve 71.

Between the outer sleeve 72 and the inner sleeve 71 inserted through the inner bore of the outer sleeve 72, the tapered portion 72b of the outer sleeve 72 is elastically in contact with and supports the outer periphery of the inner sleeve 71. Therefore, while there is a clearance between a portion of the outer sleeve 72 other than the tapered portion 72b and the inner sleeve 72, the inner sleeve 71 is prevented from ratting within the inner bore of the outer sleeve 72.

Accordingly, there is no clearance allowing the ratting of the components between the side plate 37 of the front rail bracket 35 and the stopper bolt 24, thereby preventing the occurrence of noise (contact noise between metals) generated due to the rattling of these components when the weight applied to the seat is varied.

Now, description will be made as regard to the peripheral components of the pivot bolt 25 as the pivot for the Z arm 61 and the front rail bracket 35.

As can be seen clearly in FIG. 6(B), sleeves 75 are fitted around the outer periphery of the cylindrical portion of the pivot bolt 25. Each sleeve 75 is a product made by drawing a steel sheet and has a flange 75a at one end and a tapered portion 75b at the other end. The inner surface of the sleeve 75 and the end face of the flange 75a are coated with Teflon®.

Since the sleeve 75 is press fitted into the hole 63 of the arm side plate 67 in such a manner as to press the outer periphery of the sleeve 75 against the inner periphery of the hole 63, the inner sleeve 75 is prevented from rattling within the hole 63. Between the sleeve 75 and the pivot bolt 25 inserted through the inner bore of the sleeve 75, the tapered portion 75b of the sleeve 75 is elastically in contact with and supports the outer periphery of the pivot bolt 25. Therefore, while there is a clearance between a portion of the sleeve 75 other than the tapered portion 75b and the pivot bolt 25, the stopper bolt 25 is prevented from rattling within the inner bore of the sleeve 75. Accordingly, the occurrence of noise (contact noise between metals) generated due to the rattling of the pivot bolt 25 and/or the Z arm 61 can be prevented when the weight applied to the seat is varied.

Next, the mounting portion 40 at the rear end side of the base frame 21 will be explained.

The great different point between the mounting portion 40 at the rear end side of the base frame and the aforementioned mounting portion 30 at the front end side of the base frame is that the mounting portion 40 at the rear end side of the base frame has two stopper bolts as the protective mechanism for transmitting excessive load from the rear rail bracket 45 to the base frame 21, thereby having higher load withstand capability than the mounting portion 30 at the front end side of the base frame.

That is, a front-side (first) stopper bolt 26 and a rear-side (second) stopper bolt 28 are provided to the mounting portion 40 at the rear end side. The front-side stopper bolt 26 has the same structure as the stopper bolt 24 of the mounting portion 30 at the front side mentioned above. The rear-side stopper bolt 28 is an additional reinforcing member which is not used in the mounting portion 30 at the front end side. The following description will center on the structure of the rear-side stopper bolt 28 as an additional member.

The base frame 21 has a circular hole 44 (adjacent to an elongate hole 42) near the rear end thereof through which the rear-side stopper bolt 28 is inserted. The circular hole 44 has such a diameter as to allow the insertion of the shaft portion of the rear stopper bolt 28. As can be seen clearly in FIG. 1 and FIGS. 5(A), 5(B), the rear stopper bolt 28 is provided at one end with a hexagon head 28H, at the other end with a threaded portion 28S, and at the middle with a smooth cylindrical surface, similarly to the front stopper bolt 26. The rear stopper bolt 28 is fixed by a stopper nut 28N as shown in FIG. 3(A) and FIG. 5(B) when assembled. In the assembled state, there are spaces between the hexagon head 28H of the rear stopper bolt 28 and an outer surface of the base side plate 23 and between a bearing surface of the stopper nut 28N and an outer surface of the base side plate 23. Connecting portions 9b of the seat bracket (seat legs) 9 as will be described later with reference to FIG. 10 intervene in these spaces.

A Z arm 61 (61Rr) to be arranged inside the rear side portion of the base frame 21 has the same structure as the aforementioned Z arm 61Fr arranged in the front side portion of the base frame and comprises center-side branches 66, arm side plates 67 (67L, 67R), and arm caps 66A over action portions at the ends thereof. As shown in FIG. 1 and FIGS. 3(A), 3(B), the Z arm 61Fr at the front end side of the base frame and the Z arm 61Rr at the rear end side of the base frame are arranged symmetrically about the center of the base.

The rear rail bracket 45 is arranged inside the Z arm 61Rr. As can be seen clearly in FIG. 1 and FIGS. 5(A), 5(B), the rear rail bracket 45 made of steel member is formed to have an inverted U-shaped cross section as seen in front. The rear rail bracket 45 has a flat upper plate 46 and side plates 47 (47F, 47R) formed by downwardly folding left and right edge portions thereof at an angle of 90°. The seat rail is mounted on the upper plate 46. The upper plate 46 has two holes 46a formed therein through which rivets (as will be described later; see FIG. 10) fixing the upper plate 46 to the seat rail are inserted.

Each side plate 47 of the rear rail bracket 45 is formed in a trapezoidal shape in its plan view. Each of the left and right side plates 47 has a hole 48 and an elongate hole 49 at locations corresponding to the elongate hole 42 and the circular hole 44 of the base side plate 23. As shown in FIG. 1, FIGS. 3(A), 3(B), and FIG. 6(A), the front stopper bolt 26 is inserted through the holes 48 (corresponding to the elongate holes 42 and the holes 62 of the Z arm 61Rr). A double sleeve 70 is inserted through spaces between the front stopper bolt 26 and the hole 48 of the rear rail bracket and between the front stopper bolt 26 and the hole 62 of the Z arm similarly to that described with reference to FIG. 6(A) and FIG. 7. However, the front stopper bolt 26 is loosely fitted to the elongate holes 42 of the base frame 21.

The rear stopper bolt 28 is inserted through the elongate holes 49 (corresponding to the circular holes 44) of the rear rail bracket 45 with corresponding gaps. That is, the rear stopper bolt 28 is loosely fitted to the elongated holes 49 of the rear rail bracket.

The works of the mounting portion 40 at the rear end side of the base frame 21 will be described later with reference to FIGS. 9(A), 9(B), and FIG. 10.

Hereinafter, the sensor portion 50 of the base frame 21 will be described.

As shown in FIG. 1, each of the left and right base side plates 23L, 23R is formed with a notch 23X at the middle in the longitudinal direction of the base frame 21. A protector 29 which overhangs in the leftward direction is fixed to the outer surface of the left base side plate 23L. A load sensor 51 is installed inside the notches 23X of the base frame 21 and the protector 29.

Figure 2:
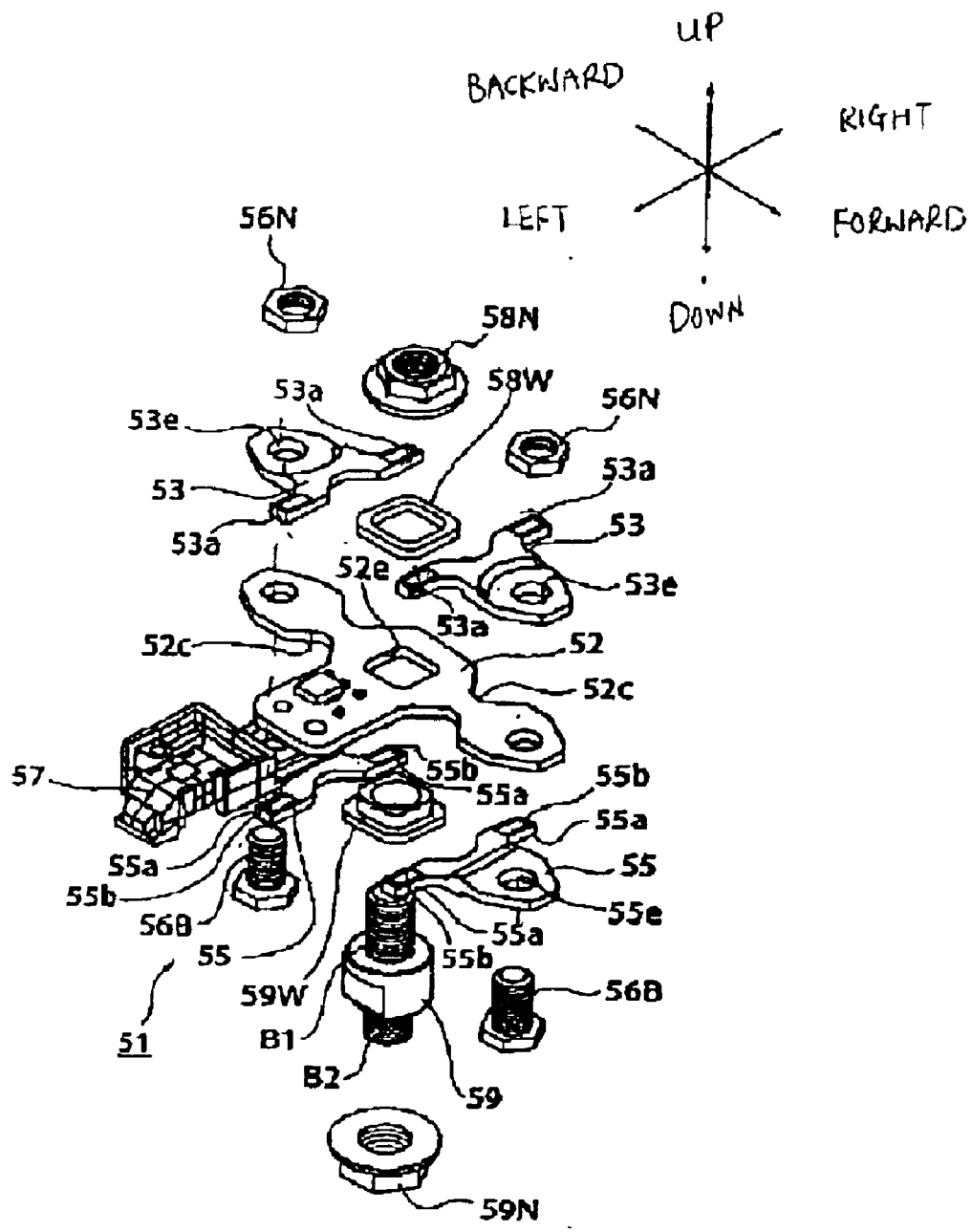
FIG. 2 is an exploded perspective view showing the structure of a sensor portion of the seat weight measuring apparatus.

As can be seen most clearly in FIG. 2, the main component of the load sensor 51 is the sensor plate (plate spring) 52 which is a rectangular plate having two necks 52c as a whole. At the left end of the central portion of the sensor plate 52, a sensor connector 57 is fixed by a vis 57a (see FIG.

4(A)). Connected to the sensor connector 57 is an end of a cable connected to an ECU (not shown). On the sensor plate 52, an insulating layer for electrical insulating, a wiring layer, and a resistive layer are formed. In the layer forming method, four strain gauges are formed, the load sensor 51 being composed of the four strain gauges. The strain gauges are connected to each other to form a bridge circuit. The measured value of strain gauges are transmitted from the sensor connector 57 to an ECU (not shown) through cables. It should be noted that the load may be obtained by conversion from deflection of the sensor plate 52 detected by electrical capacitance pressure sensors or Hall elements, instead of the detection of strain of the sensor plate 52 being detected by the strain gauges.

The structure of mounting the sensor plate 52 to the base bottom plate 22 will be described here.

Figure 4:
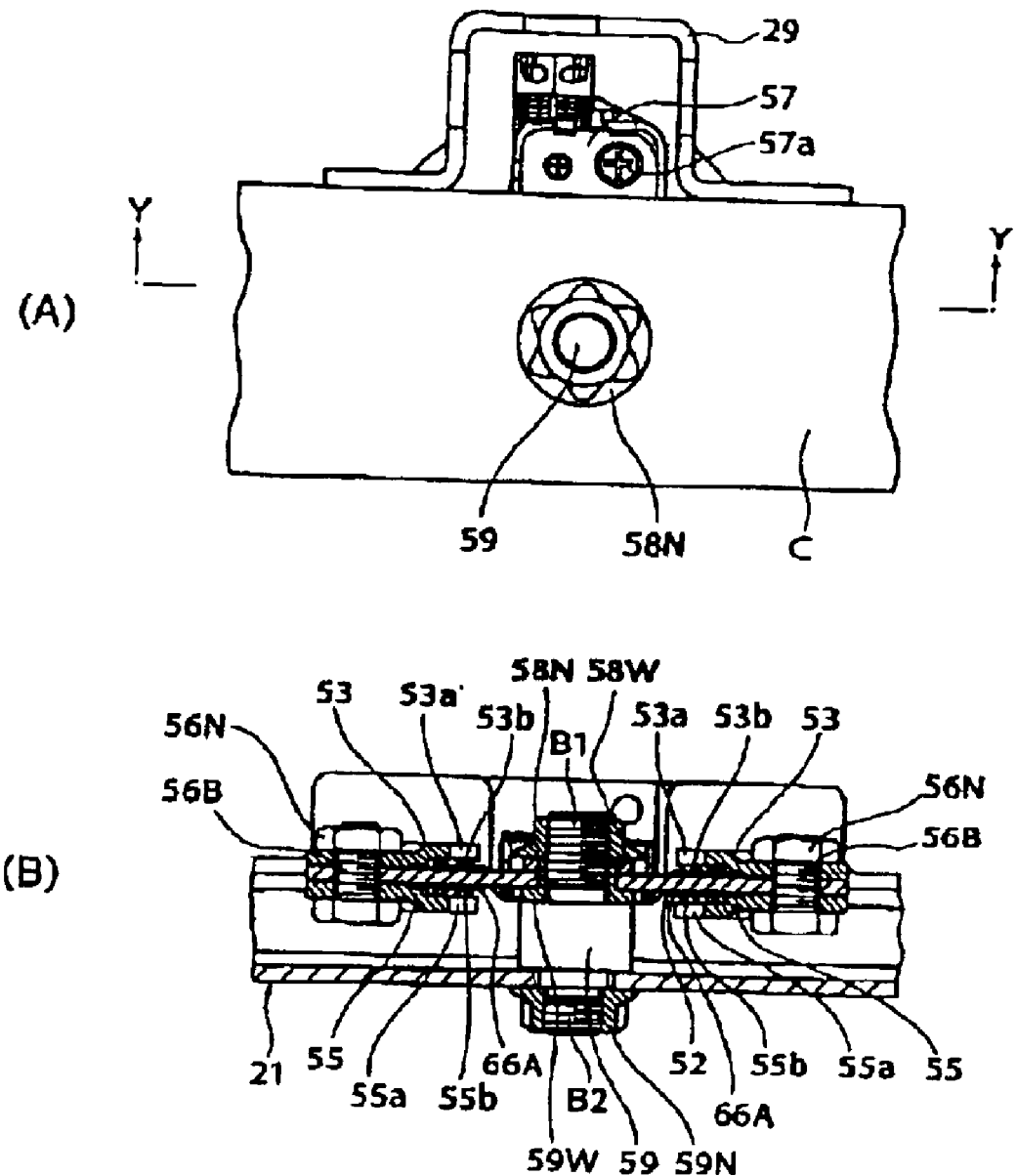
FIG. 4(A) is an enlarged plan view showing detail structure about the sensor portion of the seat weight measuring apparatus.
FIG. 4(B) is a sectional view taken along a line Y—Y of FIG. 4(A).

As can be seen clearly in FIG. 4(B), a center post 59 is fixed to the base bottom plate 22 to stand at the middle in the longitudinal direction of the base bottom plate 22. The center post 59 is a substantially cylindrical member having bolts B1, B2 projecting upwardly and downwardly. The lower bolt B2 of the center post 59 penetrates the base bottom plate 22 and is screwed into a center nut 59. The upper bolt B1 of the center post 59 penetrates a central hole 52e (see FIG. 2) of the center plate 52 and is fixed via a center washer 59 with a center nut 58N. The center of the sensor plate 52 is strongly fixed to the base bottom plate 22 of the base frame 21 through the center post 59.

The structure of the load sensor 51 will be further described.

Attached to the both front and rear ends of the sensor plate 52 are half arms 53, 55. The half arms 53, 55 are provided in the form of two pairs to be arranged above and below the front and rear ends of the sensor plate 52 to clamp the sensor plate 52 as shown in FIG. 2 and FIG. 4(B). Since the half arms 53, 55 have same configuration, a description will be made as only the half arm 55 arranged below.

As shown in FIG. 2, the half arm 55 has a base which is a rectangular plate and is provided with a mounting hole 55e formed in the center of the base. The half arm 55 has wings 55a which extend in the rightward and leftward directions from edges of the base near the center. Mound-like supports 55b are formed on the backs of the wings 55a and extend in the rightward and leftward directions. The top of each support 55b is slightly edged.

Hereinafter, a description will be made as regard to the assembly structure of the upper and lower half arms 53, 55, the sensor plate 52, and the action portions (arm caps 66A) of the Z arm 61.

As can be seen most clearly in FIG. 4(B), the bases of the upper half arm 53 and the lower half arm 55 are fully attached to the surfaces of the sensor plate 52 and are fixed by bolts 56B and nuts 56N. The wings 5, Ra, 55a of the upper and lower half arms 53, 55 are arranged in such a manner that the supports 53b, 55b confront each other. Sandwiched between the supports 53b, 55b are the arm caps 66A of the Z arm action portions. The supports 53b, 55b are positioned at the necks of the sensor plate 52.

The actions of the upper and lower half arms 53, 55, the sensor plate 52, and the Z arm 61 when load is applied to the seat weight measuring apparatus 10 are described in detail, for example, in Patent Unexamined Publication No. 2000-258223. Load applied to the seat weight measuring apparatus 10 is measured by the ECU (not shown) based on the distortion of the sensor plate 52.

Hereinafter, description will be made as regard to the works of the mounting portion 40 at the rear end side of the seat weight measuring apparatus 10 having the aforementioned structure with regard to FIGS. 9(A), 9(B) and FIGS. 10(A), 10(B).

FIGS. 9(A), 9(B) are side sectional views showing an example of a rear end portion of a base frame of a seat weight measuring apparatus as a comparative example, wherein FIG. 9(A) shows the normal state and FIG. 9(B) shows a state after a force in a direction of lifting the seat is exerted.

FIGS. 10(A), 10(B) are side sectional views showing the rear end portion of the base frame of the seat weight measuring apparatus according to the first embodiment of the present invention, wherein FIG. 10(A) shows the normal state and FIG. 10(B) shows a state after a force in a direction of lifting the seat is exerted.

Figure 9:
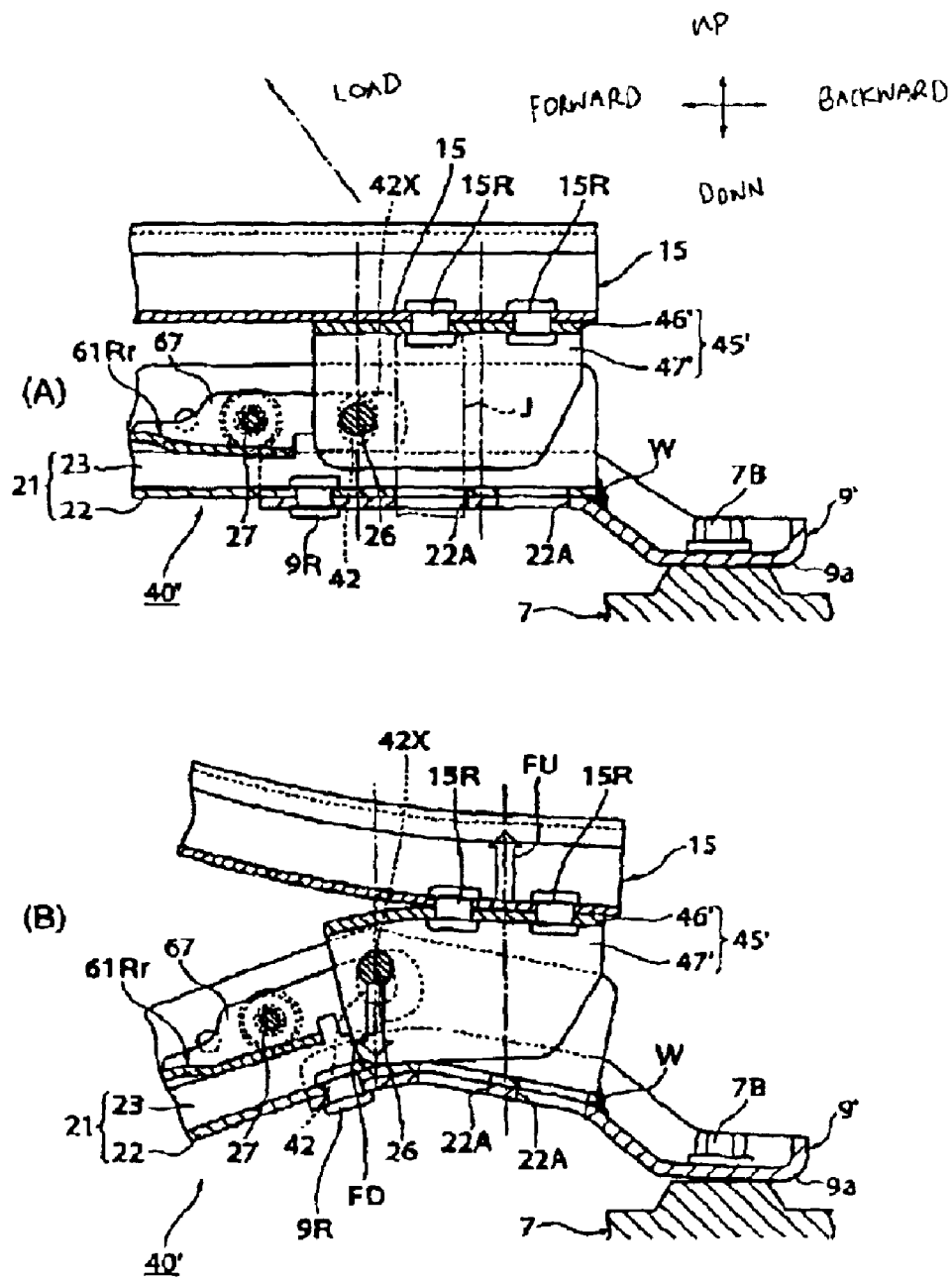
FIG. 9(A) is a side sectional view showing an example of a rear end portion of a base frame of a seat weight measuring apparatus in the normal state as a comparative example.
FIG. 9(B) is a side sectional view showing an example of a rear end portion of a base frame of a seat weight measuring apparatus in a state after a force in a direction of lifting the seat is exerted as a comparative example.

In a mounting portion 40" shown in FIG. 9, only a single stopper bolt, i.e. the front stopper bolt 26, is provided for transmitting an excessive load exerted on a rear rail bracket 45" to a base frame 21. The stopper bolt 26 is tightly fitted relative to the rear rail bracket 45" and a Z arm 61Rr and is loosely fitted in an elongate hole 42 of the base frame 21. In these drawings, a lower surface of a lower rail 15 and an upper plate 46" of the rear rail bracket 45" are connected to each other by two rivets 15R aligned in the forward and rearward direction. On the other hand, a base bottom plate 22 of the base frame 21 is connected to a seat bracket (leg) 9" by a single rivet 9R at a front side (left side in FIGS. 9(A), 9(B)) and a welded portion W at a rear side. It should be noted that the welded portion W is more securely welded (for example, by continuous welding) than spot welding shown in FIGS. 110(A), 110(B) as described later.

The seat bracket 9" is fixed to a vehicle floor 7 by a bolt 7B. The vertical center line between the two upper rivets 15R and the vertical center line of the stopper bolt 26 are shifted from each other as shown in FIGS. 9(A), 9(B). The seat bracket 9" has two holes at locations corresponding to the holes 22A formed in the aforementioned base bottom plate 22. The holes 22A are provided for insertion of a calking jig J (shown by a virtual line in FIG. 9(A)). The caulking jig J is used for driving the rivets 15R for connecting the rail 15 and the rail bracket 45" after the seat weight measuring apparatus and the seat rail 15 are put on the seat bracket 9".

Instead of the rivets 15R, bolts or nuts which can be inserted into the holes 22A may be used to connect the rail 15 and the rail bracket 45".

Figure 10:
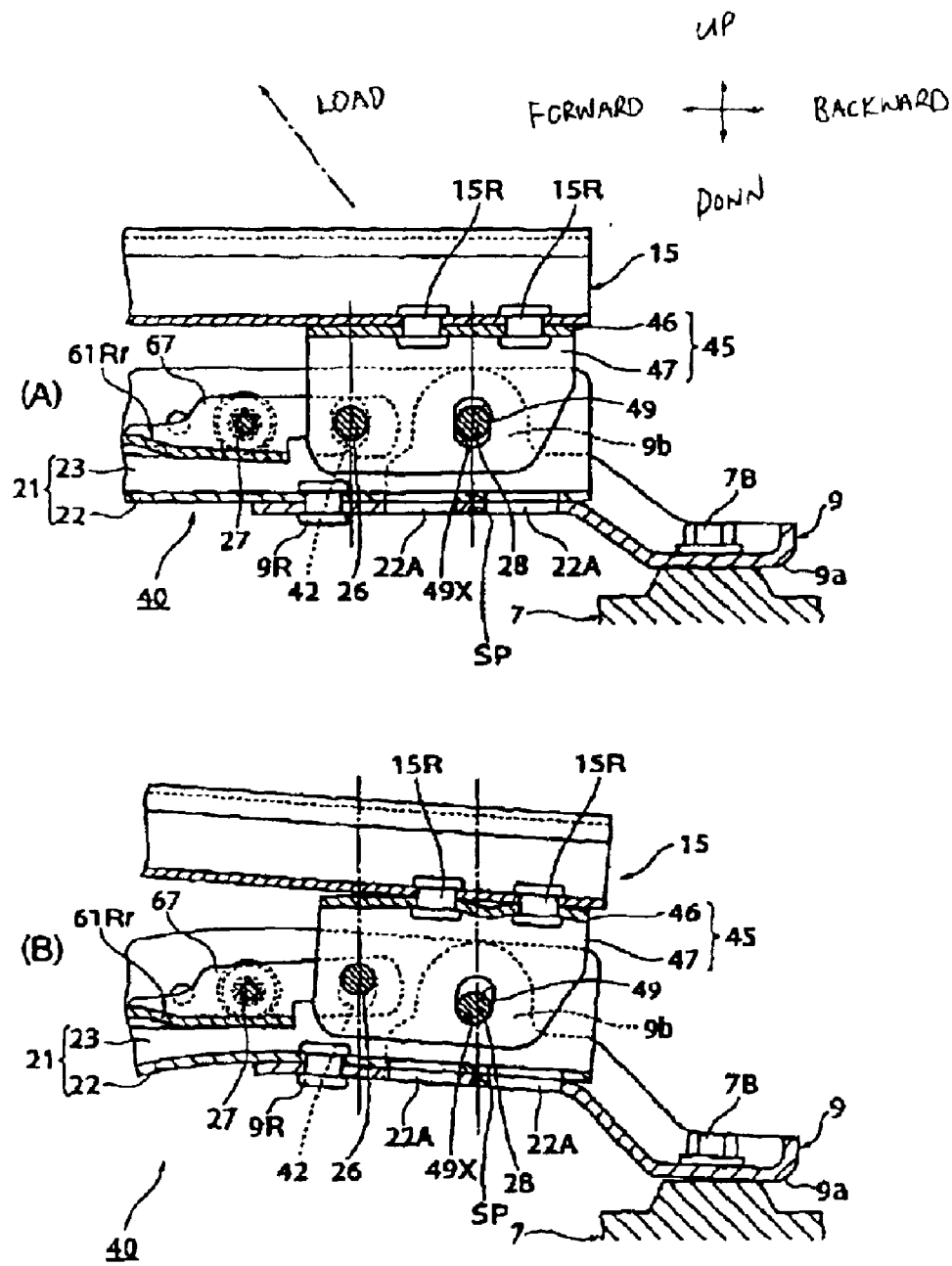
FIG. 10(A) is a side sectional view showing the rear end portion of the base frame of the seat weight measuring apparatus according to the first embodiment of the present invention in the normal state.
FIG. 10(B) is a side sectional view showing the rear end portion of the base frame of the seat weight measuring apparatus according to the first embodiment of the present invention in a state after a force in a direction of lifting the seat is exerted.

In the mounting portion 40 shown in FIG. 10, two stopper bolts, i.e. the front and rear stopper bolts 26, 28, are provided for transmitting an excessive load exerted on the rear rail bracket 45 to the base frame 21. The front stopper bolt 26 is tightly fitted relative to the rear rail bracket and the Z arm 61Rr and is loosely fitted in the elongate hole 42 of the base frame 21 (see FIG. 6(A)). On the other hand, the rear stopper bolt 28 is tightly fitted relative to the base frame 21 and is loosely fitted in the elongate hole 49 of the rear rail bracket (see FIG. 5(B)).

In the mounting portion 40, a lower surface of the lower rail 15 and the upper plate 46 of the rear rail bracket 45 are connected to each other by two rivets 15R aligned in the forward and rearward direction. The base bottom plate 22 of the base frame 21 is connected to the seat bracket 9 by a single rivet 9R at a front side (left side in FIGS. 10(A), 10(B)) and welded portions SP by spot welding (at two locations aligned in the width direction of the vehicle) at the middle. The seat bracket 9 has two holes at locations corresponding to the holes 22A (see FIG. 1) formed in the base bottom plate 22. Similarly to the above case, the holes 22A are provided for insertion of a calking jig for driving the rivets 15R. While the vertical center line between the upper two rivets 15R and the vertical center line of the front stopper bolt 26 are shifted from each other, the vertical center line between the rivets 15R substantially coincides with the vertical center line of the rear stopper bolt 28. In this example, in the event of generation of an excessive load, the load applied to the seat rail 15 is transmitted directly to the seat bracket 9 through the rail bracket 45 and the rear stopper bolt 28. Therefore, relatively simple structure is enough for the connection between the base frame 21 of the seat weight measuring apparatus and the seat bracket 9.

The seat bracket 9 shown in FIGS. 10(A), 10(B) has a fixed base 9a and connecting portions 9b extending diagonally from the fixing base 9a. The fixed base 9a is fixed to a vehicle floor 7 by a bolt 7B. The connecting portions 9b stand along the respective base side plates 23. The connecting portions 9b are disposed in spaces (see FIG. 1 and FIGS. 5(A), 5(B)) between the hexagonal head 28H of the rear stopper bolt 28 and the outer surface of the corresponding base plate 23 and between the bearing face of the stopper nut 28N and the outer surface of the corresponding base plate 23. The rear stopper bolt 28 penetrates the centers of the connecting portions 9b.

When large negative G (minus G) is applied to the vehicle body in the forward direction, for example, in the event of a vehicle collision, a moment inclining the seat toward the front acts on the seat so that the rear side of the seat is about to go up. As the seat goes up, the rear end side of the lower rail 15 is lifted.

In the case of the mounting portion 40" of the comparative example, as the rear end side of the lower seat rail 15 is lifted and the rear rail bracket 45" is thus pulled up, the stopper bolt 26 fitted to the rear rail bracket 45" is also lifted as shown in FIG. 9(B) in the exaggerated way. Then, the stopper bolt 26 is brought in contact with the upper edges 42X of the elongate holes 42 of the base side plate 23. At this point, an upward force FU is exerted on the seat bracket 45" along the vertical center line between the front and rear rivets 15R and a downward force FD is exerted along the vertical center line of the stopper bolt 26. Since the center lines are shifted from each other, great moment is applied to the seat bracket 45". Accordingly, a significant large amount of the forces is exerted on the front rivet 15R. A pulling force acts on the upper edges 42X of the elongate holes 42 of the base frame 21 due to the moment. It is therefore preferable to reinforce the upper edges 42X of the elongate holes 42 of the base side plates 23. In addition, it is required that the rear end of the base bottom plate 22 is fixed to the seat bracket 9" by relatively strong welded portion W.

In the case of the mounting portion 40 shown in FIGS. 10(A), 10(B) according to the present invention, as the rear end side of the lower seat rail 15 is lifted and the rear rail bracket 45 is thus pulled up, the rear stopper bolt 28 loosely fitted to the rear rail bracket 45 is brought in contact with the lower edges 49X of the elongate holes 49 as shown in FIG. 10(B). As a result, the lifting of the rear rail bracket 45 is locked so that reduced load is applied to the front stopper bolt 26 fitted to the rear rail bracket 45. Therefore, the force lifting up the rear rail bracket 45 is transmitted directly to the connecting portions 9b of the seat bracket 9 which the rear stopper bolt 28 penetrates. Accordingly, the strength provided by the spot welding SP is enough for fixing the base frame 21 to the seat bracket 9 at the rear side.

As shown in FIG. 10(B), the moment of inclining the seat is applied evenly to the two rivets 15R connecting the lower rail 15 and the rear rail bracket 45 so as to reduce the concentrated load to the lower rail 15 and the rear rail bracket 45 and thus prevent the lower rail 15 and the rear rail bracket 45 from being deformed. Since the vertical center line between the upper two rivets 15R is substantially the same as the vertical center line of the rear stopper bolt 28 as described above, little force of breaking the rivets 15R and little moment of bending the lower rail 15 are created. The moment of inclining the lower rail 15 is transmitted to the seat bracket 9 via the rear stopper bolt 28 and is finally received by the vehicle floor 7. The load to the base frame 21 is reduced so as to prevent the base frame 21 from being deformed. In this manner, effect of the lifting of the seat rear portion upon the mounting portion 40 is avoided.

After assembling the Z arm 61 and the front stopper bolt 26 in the base frame 21, the seat weight measuring apparatus 10 and the lower rail 15 or the seat bracket 9 are riveted together. The front stopper bolt 26 and the Z arm 61 do not interfere the riveting work because the positions of the rivets are shifted from the positions of the front stopper bolt 26 and rear ends of the Z arm 61.

Now, the structure about a vehicle seat according to another embodiment fo the present invention will be described with reference to FIG. 15.

FIG. 15 shows a vehicle seat 101. The vehicle seat 101 has a seat cushion 101a and a seat pan 102 similarly to the first mentioned embodiment. Under the seat pan 102, side frames 103, made of steel plates, extend downwardly from the seat pan 102. Each of the side frame 103 is connected at its lower side to a seat weight measuring apparatus 100. The seat weight measuring apparatus 100 is connected to a seat rail 108 via front and rear rail brackets 135, 145. The seat rail 108 is a combination of an upper rail 11 and a lower rail 115 which are arranged to slide each other in the forward and backward directions. The seat rail 108 is supported to a seat bracket 109 secured to a vehicle floor 7. The same constructions each composed of the side frame 103, the seat weight measuring apparatus 100, the seat rail 108, and the seat bracket 109 are disposed on the left and right sides of the seat 101.

Hereinafter, the details of the seat weight measuring apparatus 100 will be described.

The great different points between the seat weight measuring apparatus 100 of this embodiment and the seat weight measuring apparatus 10 of the first mentioned embodiment are the arrangement described above with reference to FIG. 15 and the structures of base frame and the front and rear rail brackets.

That is, while the seat weight measuring apparatus 10 (see FIG. 8) of the first embodiment is arranged between the seat rail 8 (upper side) and the seat bracket 9 (lower side), the seat weight measuring apparatus 100 (see FIG. 15) of the second embodiment is arranged between the side frame 103 (upper side) and the seat rail 108 (lower side).

Each Z arm 61 (61Fr, 61Rr) is identical in structure as that in the aforementioned embodiment, except that it is arranged upside down. A load sensor 51 is identical in structure as that in the aforementioned embodiment, except that it is arranged upside down. In the following description, components having the same structures and functions as those of the seat weight measuring apparatus 10 of the first embodiment, including the Z arms and the load sensor, are marked with the same numerals.

Figure 11:
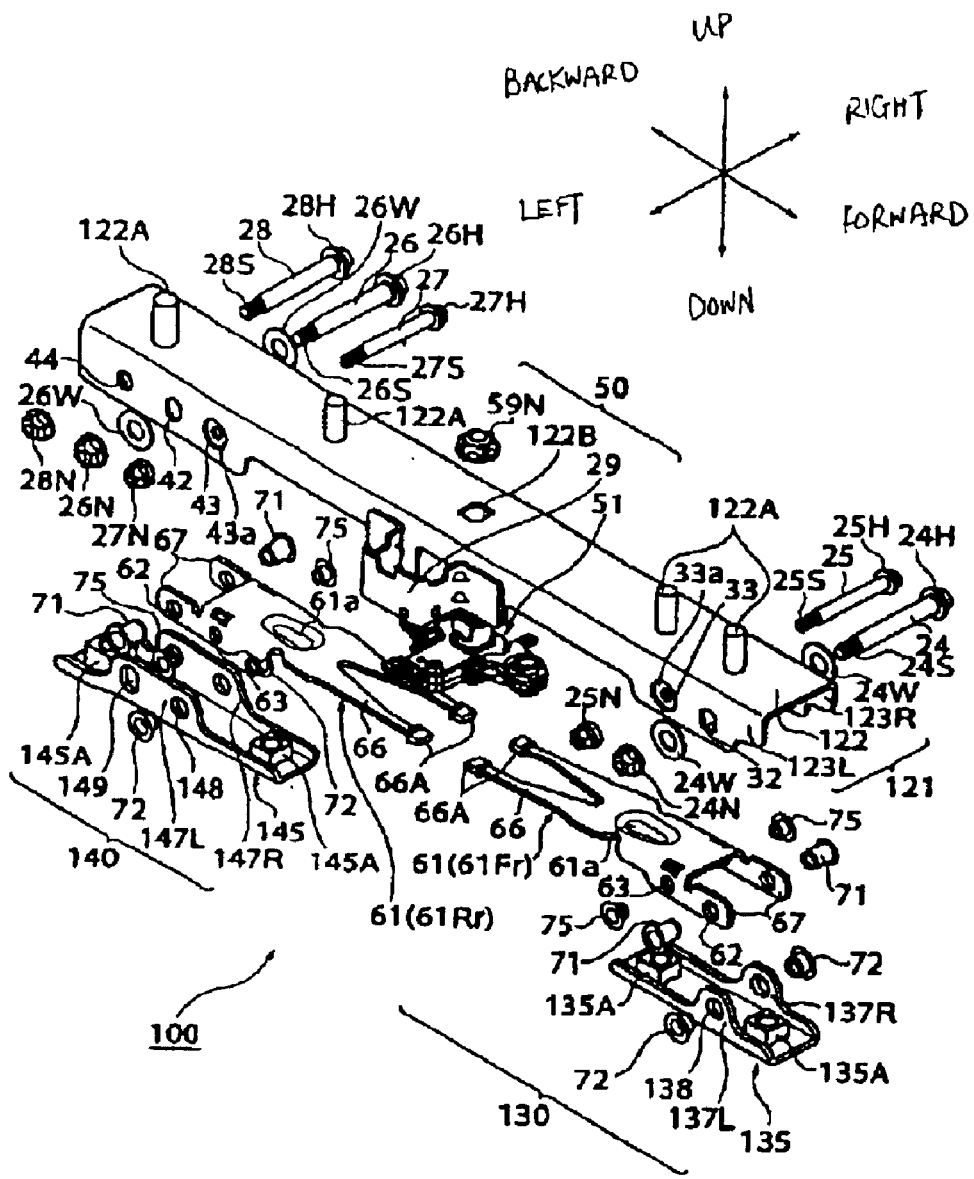
FIG. 11 is an exploded perspective view showing the general structure of a seat weight measuring apparatus according to the second embodiment of the present invention.

As can be seen clearly in FIG. 11, the base frame 121 of the seat weight measuring apparatus 100 is a product made by press-working of a steel plate having an inverted U-shaped cross section. In the second embodiment, since the base frame 121 is arranged such that the opening of the U shape faces downward, no cover is required. The ceiling of the base frame 121 will be called a base top plate 122 and portions which extends downwardly from the left and right edges of the base top plate 122 to form corners of 90° therebetween will be called base side plates 123 (123L, 123R).

Figure 13:
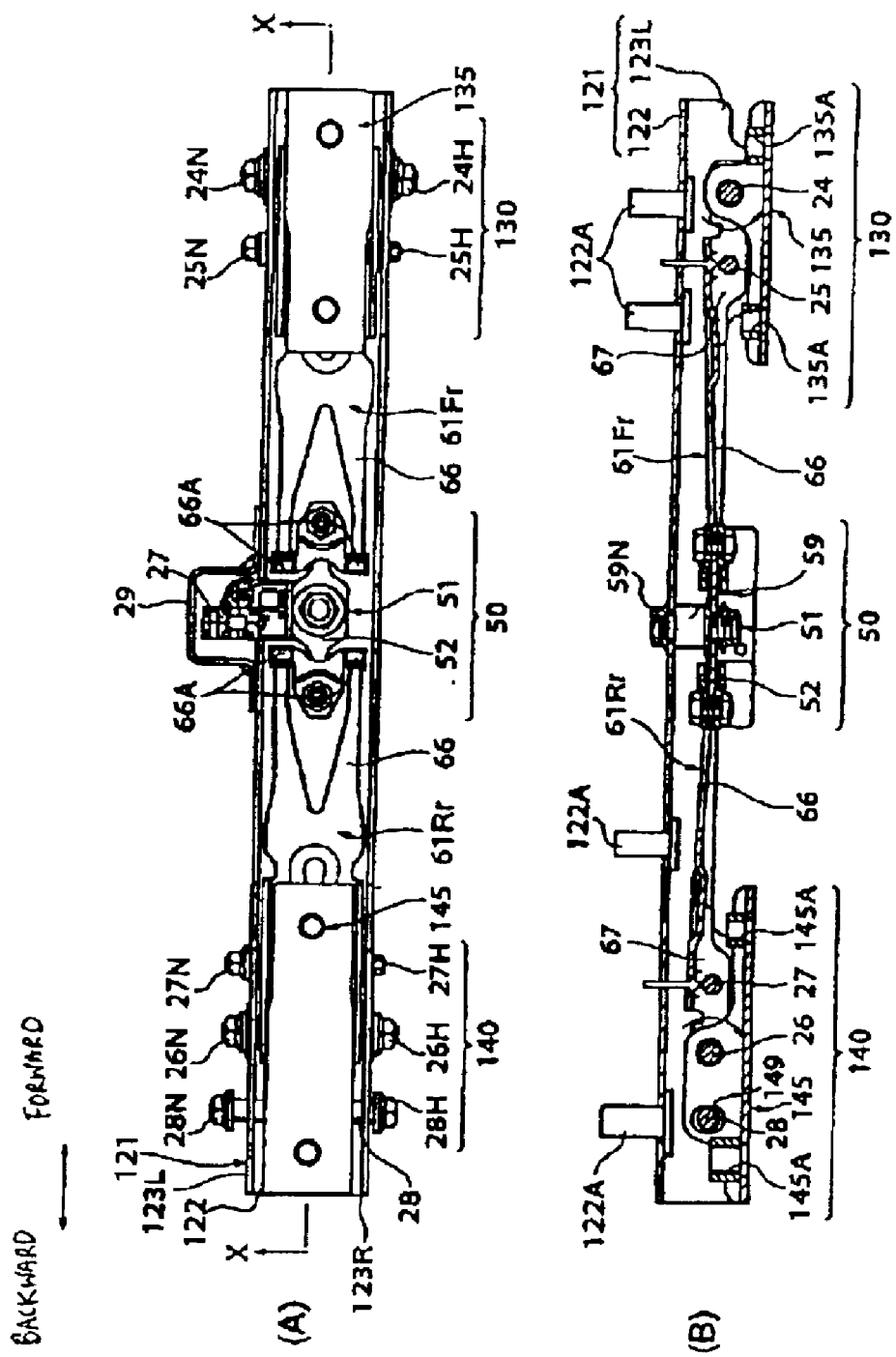
FIG. 13(A) is a plan view showing the general structure (in the assembled state) of the seat weight measuring apparatus.
FIG. 13(B) is a sectional view taken along a line X—X of FIG. 13(A).
Figure 14:
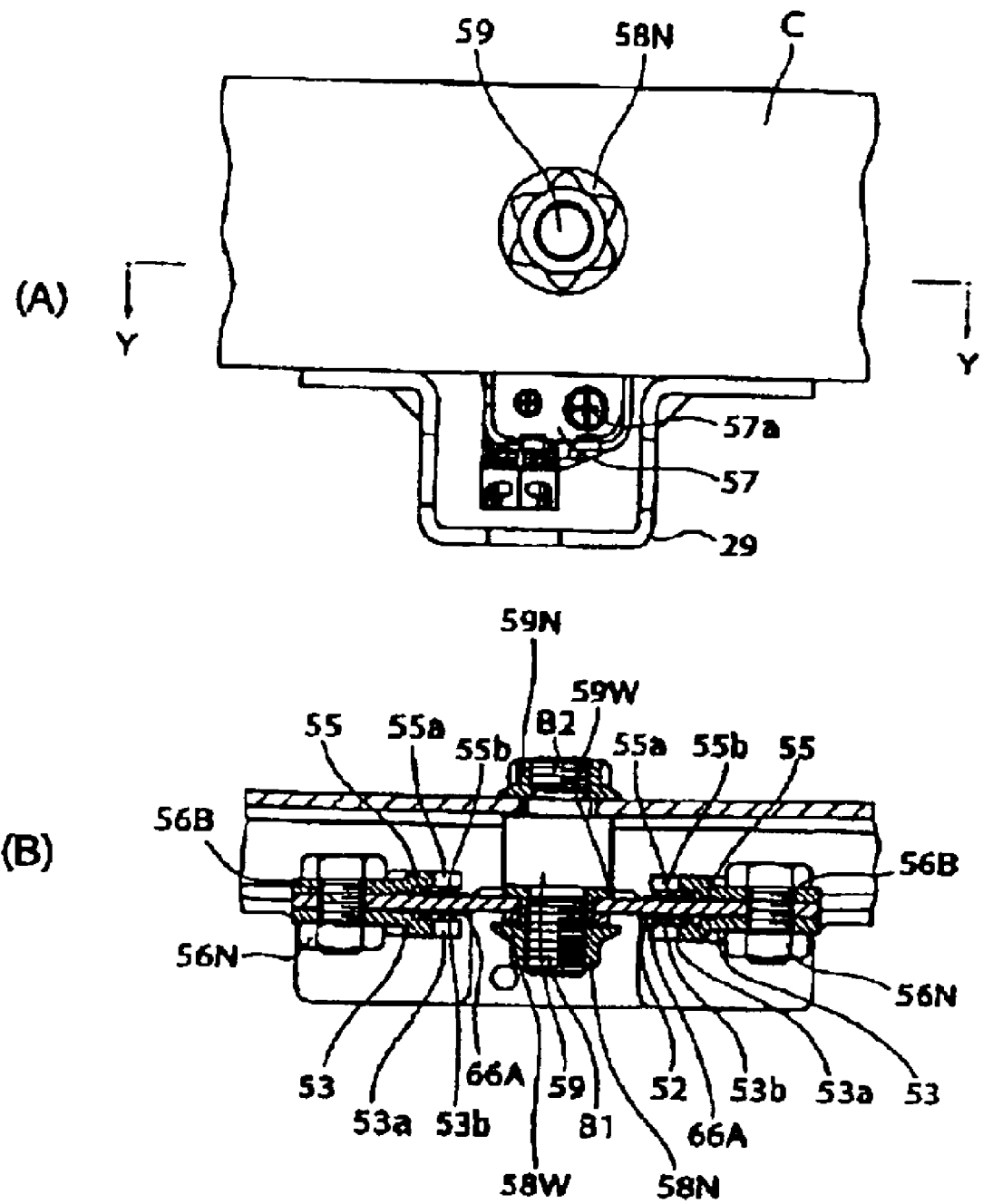
FIG. 14(A) is an enlarged plan view showing detail structure about the sensor portion of the seat weight measuring apparatus.
FIG. 14(B) is a sectional view taken along a line Y—Y of FIG. 14(A).

The base top plate 122 has a plurality of (four in the illustrated example) bolts 122A which are studded at predetermined positions as shown in FIG. 11 and FIGS. 13 (A), 13(B). These bolts 122A are projected above the base top plate 122. These bolts 122A are inserted through the side frame 103 (or a bracket attached to the side frame) of the seat 1 and fastened by nuts. It is preferable that each of holes formed in the side frame 103 is larger than the major diameter of each bolt 122A.

The base frame 121 is provided near the front and rear ends thereof with mounting portions 130, 140, respectively, for attaching the apparatus to a vehicle body or the seat rail and is provided at the middle thereof with a sensor portion 50.

First, in the mounting portion 130 at the front end side of the base frame 121, each base side plate 123 has two holes (an elongate hole 32, a pivot hole 33) formed in a front end portion thereof. Inserted into the elongated holes 32 is a stopper bolt 24 and inserted into the pivot holes 33 is a pivot bolt 25. A Z arm 61 (61Fr) is arranged inside the base frame 121. The Z arm 61 in the second embodiment is arranged upside down, as compared to the first embodiment, such that the left and right arm side plates 67 (67L, 67R) extend downwardly by 90°. Inserted into the holes 62 (corresponding to the elongate holes 32 of the base frame 121) of the Z arm 61 is the stopper bolt 24. Inserted into the holes 63 (corresponding to the pivot holes 33 of the base frame 121) of the Z arm 61 is the pivot bolt 25.

In this arrangement, the stopper bolt 24 is the pivot of the Z arm 61. When the Z arm 61 pivots about the stopper bolt 24, sliding movement is generated between the stopper bolt 24 and the Z arm 61. On the other hand, the pivot bolt 25 penetrates both the base frame 121 and the Z arm 61 and is supported by them so as to transmit load on the base frame 121 to the Z arm 61, whereby the Z arm 61 pivots as shown in FIG. 13(B). Since there are gaps of elongated holes 32A between the base frame 121 and the stopper bolt 24, the base frame 121 and the stopper bolt 24 are normally prevented from interfering each other.

At the mounting portion 130 at the front end side, the front rail bracket 135 is assembled inside the Z arm 61. As shown in FIG. 11 and FIGS. 13(A), 13(B), the front rail bracket 135 is a member made of a steel plate and is formed by upwardly folding left and right edge portions of the sheet plate. Cylindrical nuts 135A are welded to the front rail bracket 135 at two locations near the front end and the rear end, respectively. Inserted into the cylindrical nuts 135A are bolts (not shown) for mounting the front rail bracket 135 to the seat bracket 109. The front rail bracket 135 has connecting portions 137 (137L, 137R) standing from the left and right side edges thereof. The left and right connecting portions 137 are provided with holes 138, respectively, formed to face to each other. Each hole 138 is formed at a position corresponding to the elongate holes 32 of the base side plate 123 and the holes 62 of the Z arm 61. The stopper bolt 24 is inserted through the holes 138 when assembled as shown in FIGS. 13(A), 13(B).

Also in the seat weight measuring apparatus 100, double sleeves 70 are fitted around the outer periphery of the stopper bolt 24, while sleeves 75 are fitted around the outer periphery of the pivot bolt 25. The spring action of the double sleeves 70 and the sleeves 75 can prevent the occurrence of noise (contact noise between metals) generated when the weight applied to the seat is varied.

The mounting portion 140 at the rear end side of the base frame 121 has higher load withstand capability than the mounting portion 130 at the front end side of the base frame in the same manner as the first embodiment.

That is, as shown in FIG. 11 the mounting portion 140 at the rear end side of the base frame 121, each base side plate 123 has three holes (an elongate hole 42, a pivot hole 43, and a circular hole 44). Inserted into the elongated holes 42 is a front stopper bolt 26. Inserted into the pivot holes 43 is a pivot bolt 27. Inserted into the circular hole 44 formed at a position nearest to the rear end of the base is a rear stopper bolt 28. In the assembled state of the seat weight measuring apparatus 100, the bolt 122A studded near the rear end of the base top plate 122 is positioned substantially right over the rear stopper bolt 28 (see FIG. 11, FIGS. 13(A), 13(B)).

A Z arm 61 (61Rr) to be arranged inside the rear side portion of the base frame 121 has the same structure as the aforementioned Z arm 61Fr arranged in the front side portion of the base frame and is arranged upside down to have arm side plates 67 (67L, 67R) extending downwardly by 90°. Inserted into the holes 62 (corresponding to the elongate holes 42) of the Z arm 61 is the front stopper bolt 26. Inserted into the holes 63 (corresponding to the pivot holes 43) of the Z arm 61 is the pivot bolt 27.

In the mounting portion 140 at the rear end side, a rear rail bracket 145 is arranged inside the Z arm 61Rr. As shown in FIG. 11 and FIGS. 13(A), 13(B), the rear rail bracket 145 is a member made of a steel plate and is formed by upwardly folding left and right edge portions of the sheet plate. Cylindrical nuts 145A are welded to the rear rail bracket 145 at two locations near the front end and the rear end, respectively. Inserted into the cylindrical nuts 145A are bolts (not shown) for mounting the rear rail bracket 145 to the seat bracket 109, similarly to the front bracket 135. The rear rail bracket 145 has connecting portions 147 (147L, 147R) standing from the left and right side edges thereof. Each of the left and right connecting portions 147 is provided with a hole 148 and an elongate hole 149 formed at respective positions corresponding to the elongate holes 42 and the circular holes 44 of the base side plates 123. The front stopper bolt 24 is inserted through the holes 148 (corresponding to the elongate holes 42 and the holes 62 of the Z arm) as shown in FIG. 11 and FIGS. 13(A), 13(B).

Similarly to the case described with reference to FIG. 6(A), the front stopper bolt 26 is inserted through the holes 148 of the rear rail bracket 145 and the holes 62 of the Z arm 61Rr with the double sleeves 70 (inner sleeves 71 and outer sleeves 72) therebetween and is loosely inserted through the elongate holes 42 of the base frame 121. On the other hand, the rear stopper bolt 28 is inserted through the elongate holes 149 (corresponding to the circular holes 44) of the rear rail bracket 145. The rear stopper bolt 28 is loosely fitted to the elongate holes 149 of the rear rail bracket 145 and is inserted through the circular holes 44 of the base frame 121. The sleeves 75 which are the same as described above are inserted through spaces between the pivot bolt 27 and the holes 63 of the Z arm 61Rr.

Figure 12:
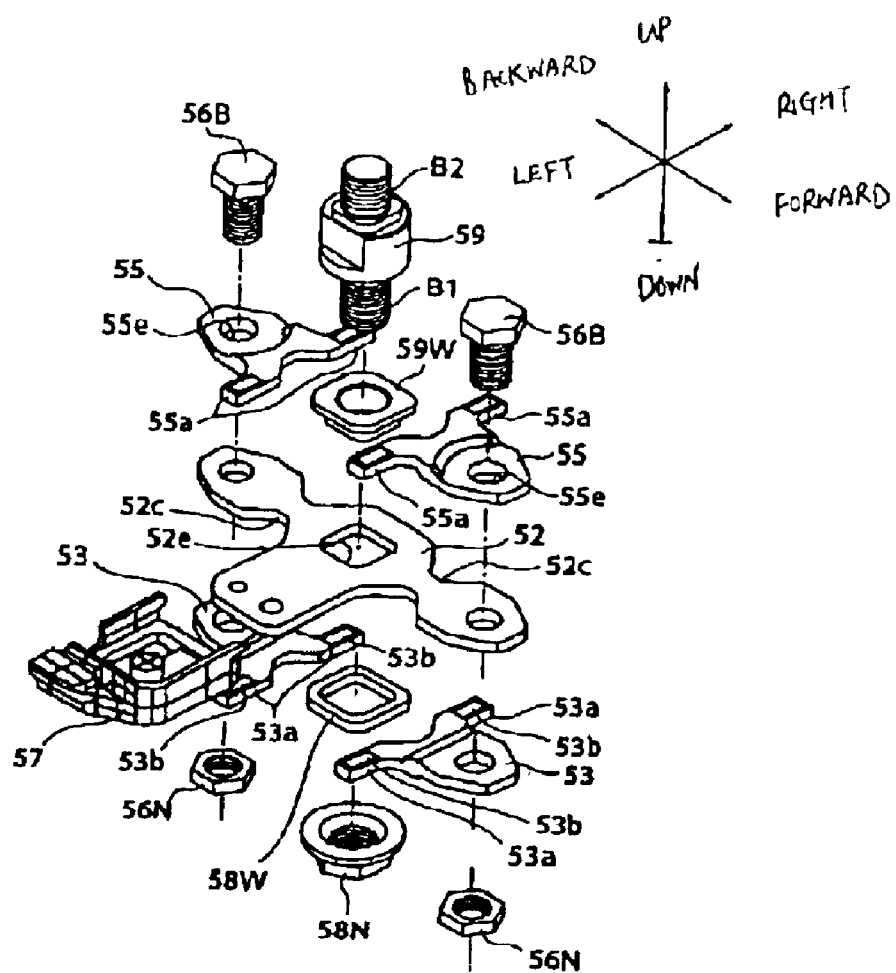
FIG. 12 is an exploded perspective view showing the structure of a sensor portion of the seat weight measuring apparatus.

The load sensor 51 positioned at the middle of the base frame 121 is arranged upside down as shown in FIG. 12 to correspond to the arrangement of the base frame 121 which is arranged upside down. However, the load sensor 51 is identical in structure as that in the first embodiment. In this case, the moment created when load is applied to the seat weight measuring apparatus 100 is opposite to the moment of the first embodiment in the vertical direction. A hole marked by a numeral 122B formed at the center of the base frame 121 shown in FIG. 11 is a hole through which a bolt B2 of the center post 59 is inserted.

Also in the seat weight measuring apparatus 100, similarly to the seat weight measuring apparatus 10, the two stopper bolt 26, 28 increase the load withstand capability of the mounting portion 140 at the rear end side of the base frame 121 to be higher than that of the mounting portion 130 at the front end side of the base frame, thus preventing the mounting portion 140 from being deformed due to the lifting of the rear side portion of the seat. In the mounting portion 140 at the rear end side, the bolt 122A is positioned substantially right over the rear stopper bolt 28 as shown in FIG. 11 and FIGS. 13(A), 13(B). Therefore, the path (line of force) of transmitting force from the vehicle floor to the seat via the rear stopper bolt 28 and the bolt 122A of the seat weight measuring apparatus 100 is nearly straight, thereby further increasing the load withstand capability.

In the seat weight apparatus 100, even when residual stress may be applied in the seat weight measuring apparatus 100 due to the effect from the surface of the vehicle floor 107, the residual stress can be absorbed by clearance generated in the slidable connection between the upper rails 111 and the lower rails 115 of the seat rails 108 which exists between the seat brackets 109 on the vehicle floor 107 and the seat weight measuring apparatuses 100. Therefore, the effect is hardly transmitted from the surface of the vehicle floor 107 to the seat weight measuring apparatus 100, thereby securely keeping the sufficient accuracy of the apparatus. Further, since the base frame 121 is arranged to face downwardly, invading dust and other particles hardly collect inside the base frame 121. It avoids necessity of providing a cover or the like for closing the openings of the base frame 121, thereby reducing the cost and the weight.

As apparent from the above description, the present invention can provide a seat weight measuring apparatus having advantages that the possibility of damaging the mounting portion due to the lifting of the rear side of the seat can be reduced.

The priority application, Japanese Patent Application No. 2001-379906, filed Dec. 13, 2001, is hereby incorporated by reference.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims and equivalents thereof.

What is claimed is:

1. A seat weight measuring apparatus for measuring a seat weight including the weight of a passenger sitting on a vehicle seat comprising:

a base frame fixed to a vehicle floor;

front and rear rail brackets which are located near front and rear ends of the base frame, respectively, and are connected to a seat rail which is slidable in the frontward and rearward directions of the vehicle;

a sensor portion which is mounted on the base frame for detecting the load applied from the rail brackets to the base frame;

wherein the sensor portion includes a distortion sensor fixed at the middle in the longitudinal direction of the base frame and arms which are disposed at a front portion and a rear portion of the base frame, respectively, to extend in the longitudinal direction, each arm having at its one end a press portion for transmitting force to the distortion sensor and at its other end a connecting portion relative to the rail bracket;

wherein protective mechanisms are disposed around the front and rear rail brackets so that when the load applied on the rail brackets and the base frame exceeds a predetermined value, the protective mechanisms transmit the excessive load between the rail brackets and the base frame or the vehicle floor directly and not through the arms; and wherein the protective mechanism at the rear side is provided with a reinforcing member for providing reinforcement against the load in a direction in which the rail brackets are lifted upward.

2. A seat weight measuring apparatus according to claim 1, wherein the reinforcing member is fixed directly to the seat bracket on the vehicle floor, and the excessive load is transmitted from the rail bracket to the seat bracket through the reinforcing member.

3. A seat weight measuring apparatus according to claim 1, wherein the protective mechanism at the rear side comprises:

a first stopper bolt which connects the rail bracket and the arm in such a manner as to allow the pivotal movement of them and is stopped by the base frame in the event of excessive load; and a second stopper bolt as the reinforcing member which transmits the excessive load between the rail bracket and the base frame or the vehicle floor to prevent the deformation of the apparatus due to the excessive load.

4. A seat weight measuring apparatus according to claim 3, wherein the second stopper bolt is positioned right above or right below the connecting portion of the seat rail and the seat bracket.

5. A seat weight measuring apparatus according to claim 3, wherein the second stopper bolt is fixed to the base frame or the vehicle floor and is loosely fitted to the rail bracket and the first stopper bolt is loosely fitted to the base frame.

6. A seat weight measuring apparatus according to claim 3, wherein the seat rail and the rail bracket are connected to each other by a rivet;

the vertical center line of the rivet is shifted from the vertical center line of the first stopper bolt; and the vertical center line of the rivet substantially coincides with the vertical center line of the second stopper bolt.

7. A seat weight measuring apparatus for measuring a seat weight including the weight of a passenger sitting on a vehicle seat comprising:

a base frame fixed to a lower side of a seat frame below the vehicle seat;

front and rear rail brackets which are located near front and rear ends of the base frame, respectively, and are connected to a seat rail which is slidable in the frontward and rearward directions of the vehicle;

a sensor portion which is mounted on the base frame for detecting the load applied from the rail brackets to the base frame;

wherein the sensor portion includes a distortion sensor fixed at the middle in the longitudinal direction of the base frame and arms which are disposed at a front portion and a rear portion of the base frame, respectively, to extend in the longitudinal direction, each arm having at its one end a press portion for transmitting force to the distortion sensor and at its other end a connecting portion relative to each rail bracket;

wherein protective mechanisms are disposed around the front and rear rail brackets so that when the load applied on the base frame and the rail brackets exceeds a predetermined value, the protective mechanisms transmit the excessive load between the base frame and the rail brackets directly and not through the arms; and wherein the protective mechanism at the rear side is provided with a reinforcing member for providing reinforcement against the load in a direction in which the base frame is lifted upward.

8. A seat weight measuring apparatus according to claim 7, wherein the protective mechanism at the rear side comprises:

a first stopper bolt which connects the rail bracket and the arm in such a manner as to allow the pivotal movement of them and is stopped by the base frame in the event of excessive load; and a second stopper bolt as the reinforcing member which transmits the excessive load between the rail bracket and the base frame or the vehicle floor to prevent the deformation of the apparatus due to the excessive load.

9. A seat weight measuring apparatus according to claim 8, wherein the second stopper bolt is positioned right above or right below the connecting portion of the seat rail and the seat bracket.

10. A seat weight measuring apparatus according to claim 8, wherein the second stopper bolt is fixed to the base frame or the vehicle floor and is loosely fitted to the rail bracket and the first stopper bolt is loosely fitted to the base frame.

11. A seat weight measuring apparatus according to claim 8, wherein the seat rail and the rail bracket are connected to each other by a rivet;

the vertical center line of the rivet is shifted from the vertical center line of the first stopper bolt; and the vertical center line of the rivet substantially coincides with the vertical center line of the second stopper bolt.

12. A seat weight measuring apparatus for measuring a seat weight including the weight of a passenger sitting on a vehicle seat, comprising:

a base frame extending in the frontward and rearward directions of the vehicle;

rail brackets which are located near front and rear ends of the base frame, respectively, to interpose between the base frame and a seat rail which is slidable in the frontward and rearward directions of the vehicle;

a sensor portion which is mounted on the base frame;

wherein the sensor portion includes a distortion sensor fixed at the middle in the longitudinal direction of the base frame and arms which are disposed at a front portion and a rear portion of the base frame, respectively, to extend in the longitudinal direction, each arm having at its one end a press portion for transmitting force to the distortion sensor and at its other end with a connecting portion relative to the each rail bracket; and wherein tip ends of the press portions of the arms are covered with resin caps.

* * * * *